US011919492B2

(12) United States Patent
Ishino et al.

(10) Patent No.: US 11,919,492 B2
(45) Date of Patent: Mar. 5, 2024

(54) BRAKE SYSTEM FOR WORK VEHICLES

(71) Applicant: Yanmar Power Technology Co., Ltd., Osaka (JP)

(72) Inventors: Tatsuya Ishino, Osaka (JP); Toshikazu Matsubayashi, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 497 days.

(21) Appl. No.: 17/056,700

(22) PCT Filed: Apr. 11, 2019

(86) PCT No.: PCT/JP2019/015800
§ 371 (c)(1),
(2) Date: Nov. 18, 2020

(87) PCT Pub. No.: WO2019/225198
PCT Pub. Date: Nov. 28, 2019

(65) Prior Publication Data
US 2021/0213925 A1  Jul. 15, 2021

(30) Foreign Application Priority Data
May 22, 2018 (JP) ................................ 2018-098270

(51) Int. Cl.
*B60T 13/74* (2006.01)
*B60T 1/02* (2006.01)
(Continued)

(52) U.S. Cl.
CPC .............. *B60T 13/746* (2013.01); *B60T 1/02* (2013.01); *B60T 7/04* (2013.01); *B60T 7/12* (2013.01);
(Continued)

(58) Field of Classification Search
CPC . B60T 13/746; B60T 7/04; B60T 1/02; B60T 7/12; B60T 17/221;
(Continued)

(56) References Cited

U.S. PATENT DOCUMENTS

2017/0341633 A1* 11/2017 Blattert ................. B60T 13/146
2022/0266805 A1*  8/2022 Park ........................... B60T 8/92

FOREIGN PATENT DOCUMENTS

JP          2000-302017          10/2000

OTHER PUBLICATIONS

Japanese Patent No. JP 2009061909 to Umemoto et al published on Mar. 26, 2009.*

(Continued)

*Primary Examiner* — Pamela Rodriguez
(74) *Attorney, Agent, or Firm* — Chris Mizumoto

(57) ABSTRACT

An emergency stop brake operation assembly necessary for a work vehicle when travelling autonomously in an unmanned state is provided in this brake system without introducing problems to manual driving of the work vehicle by an occupant. This brake system for work vehicles comprises: a brake pedal that is disposed in a driving section; a brake that brakes left and right rear wheels; a linkage mechanism that links the brake pedal and the brake in such a manner as to allow the brake pedal and the brake to operate in conjunction with each other; and an electric brake operating device that actuates the brake in response to an emergency stop command. The brake operating device has: an operation-receiving body that is coupled to the brake pedal; an electric actuator that operates the operation-receiving body; and a clearance-provided section which is located between the brake pedal and the electric actuator and allows displacement of the brake pedal and the linkage mechanism with respect to the electric actuator when the brake pedal is depressed.

5 Claims, 20 Drawing Sheets

(51) Int. Cl.
  *B60T 7/04* (2006.01)
  *B60T 7/12* (2006.01)
  *B60T 11/04* (2006.01)
  *B60T 17/22* (2006.01)
  *F16H 57/02* (2012.01)

(52) U.S. Cl.
  CPC .............. *B60T 11/04* (2013.01); *B60T 17/221* (2013.01); *F16H 57/02* (2013.01); *B60T 2270/402* (2013.01); *B60T 2270/406* (2013.01); *F16H 2057/02034* (2013.01); *F16H 2057/02082* (2013.01)

(58) Field of Classification Search
  CPC ......... B60T 2270/406; B60T 2270/402; B60T 11/04; F16H 2057/02082; F16H 2057/02034
  See application file for complete search history.

(56) References Cited

OTHER PUBLICATIONS

Japanese Patent No. JP 2016078612 to Azumaguchi published on May 16, 2016.*

* cited by examiner

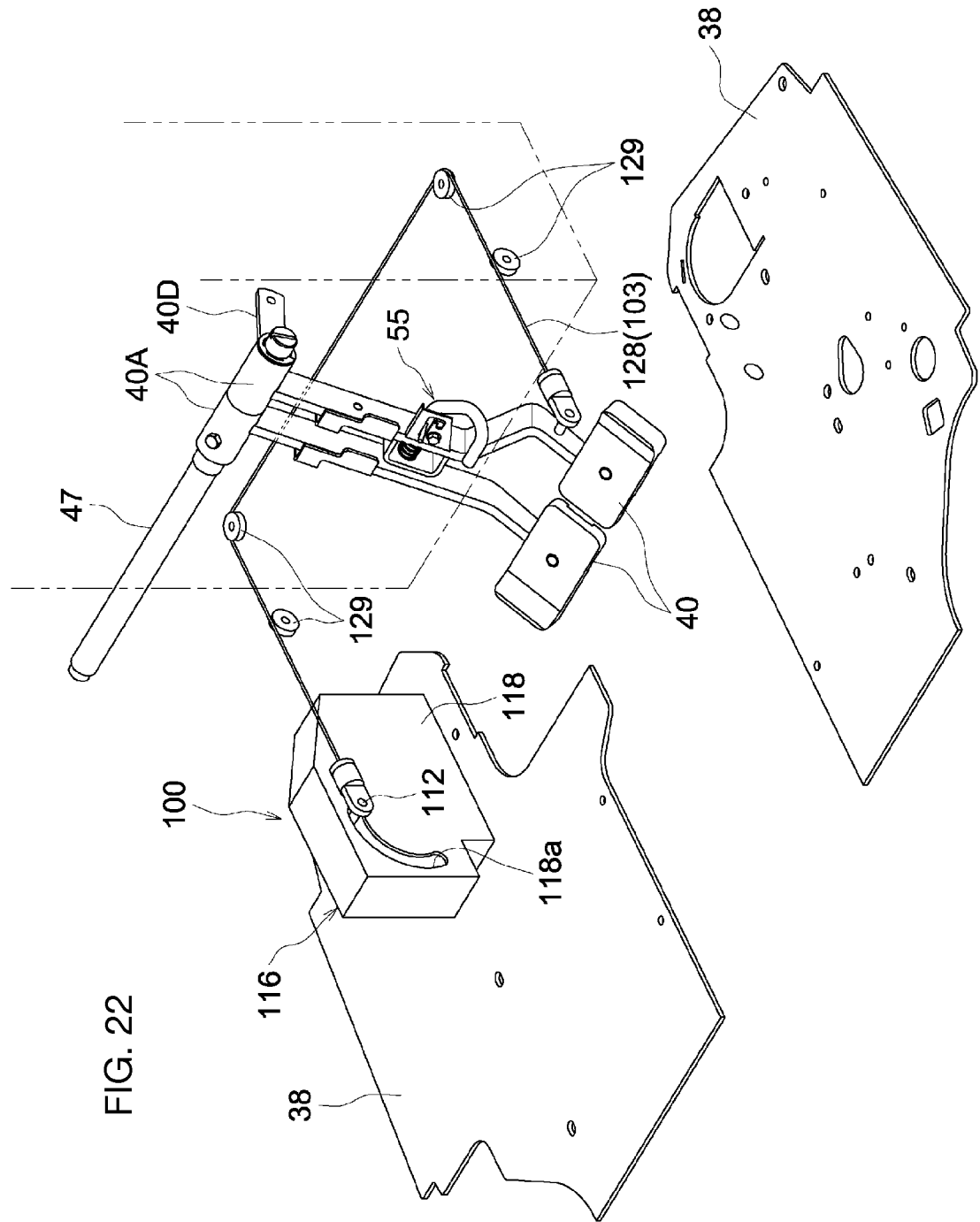

BRAKE SYSTEM FOR WORK VEHICLES

CROSS-REFERENCE

This application is a US National Stage Application under 35 U.S.C. § 371 of International Application No. PCT/JP2019/015800 filed Apr. 11, 2019, which claims foreign priority of JP2018-098270 filed May 22, 2018, the disclosures of which are hereby incorporated by reference in their entirety.

TECHNICAL FIELD

The present invention relates to a brake system for work vehicles including a brake for braking a traveling device such as a wheel or a crawler in conjunction with a stepping operation on a brake pedal.

BACKGROUND ART

For example, as a brake system for work vehicles, there is one that includes left and right brake pedals, a parking brake lever, left and right brakes that brake left and right rear wheels, left and right linkage mechanisms (left and right brake operation rods or the like) that link the left and right brake pedals and the left and right brakes in such a manner as to allow the left and right brake pedals and the left and right brakes to operate in conjunction with each other, an equalizer wire that connects the parking brake lever and the left and right brakes in such a manner as to allow the parking brake lever and the left and right brakes to operate in conjunction with each other, an electro-hydraulically-controlled brake operating device (automatic braking solenoid valve or the like) that activates the brake on the inner side of the turn in conjunction with an operation of rotating a steering handle to an angle equal to or larger than a set angle, etc., and is configured so that, in a case where an operation related to braking of any one of the left and right brake pedals, the parking brake lever, and the steering handle is performed by a passenger, the corresponding brake is activated so as to brake the corresponding rear wheel (for example, see Patent Literature 1).

CITATION LIST

Patent Literature

Patent Literature 1: Japanese Unexamined Patent Application Publication No. 2016-78612

DISCLOSURE OF INVENTION

Problems to be Solved by the Invention

In recent years, the automation of work vehicles by which a work vehicle such as a tractor is configured to be capable of autonomously traveling by use of a satellite positioning system (NSS: Navigation Satellite System) such as GPS (Global Positioning System) has been progressed. As such automation of work vehicles progresses, unmanned operation for enabling a work vehicle to autonomously travel in an unmanned state is progressed, and, in order to realize the progress of unmanned operation, it is necessary for the work vehicle to have a function of stopping the traveling of the work vehicle in a case where an abnormality, such as a control malfunction of a control system related to autonomous traveling such as a transmission control system or a steering control system, occurs in the work vehicle that is autonomously traveling in an unmanned state in such a way that the vehicle speed does not match the target vehicle speed for autonomous traveling or that the work vehicle deviates from the target travel route for autonomous traveling, for example.

Regarding the function of stopping the traveling of the work vehicle, since the above-described work vehicle described in Patent Literature 1 includes a hydraulic continuously-variable transmission machine to which a deceleration operation to the stopped state (zero speed state) can be performed, it is considered that the work vehicle has an autonomous stopping function for stopping the traveling of the work vehicle by decelerating the hydraulic continuously-variable transmission machine to the stopped state by a control operation of the transmission control system.

However, in a case where the above-described autonomous stopping function is simply included, it is not possible to stop the traveling of the work vehicle when an unexpected abnormality, such as a decrease in the hydraulic pressure to the hydraulic continuously-variable transmission machine, occurs to the work vehicle.

That is, in order to realize the progress of unmanned operation for enabling a work vehicle to autonomously traveling in an unmanned state, it is necessary that the brake system includes a brake operation system for quickly and emergently stopping the work vehicle when an unexpected abnormality such as a decrease in the hydraulic pressure occurs to the work vehicle. Furthermore, since the work vehicle capable of autonomously traveling in an unmanned state is originally configured to be manually driven by a passenger to travel, it is necessary that the brake operation system for an emergency stop is installed so as not to interfere with the manual driving by the passenger.

In view of this situation, the main object of the present invention is to provide a brake operation system for an emergency stop, which is necessary for a work vehicle to autonomously traveling in an unmanned state, to the brake system so as not to interface manual driving of the work vehicle by a passenger.

Means for Solving the Problems

The first characteristic configuration of the present invention is that the brake system for work vehicles includes: a brake pedal disposed in a driving section; a brake configured to brake a traveling device; a linkage mechanism configured to link the brake pedal and the brake in such a manner as to allow the brake pedal and the brake to operate in conjunction with each other; and an electric brake operating device configured to activate the brake in response to an emergency stop command, wherein the brake operating device includes an operation-receiving body that is connected to the brake pedal or the linkage mechanism, an electric actuator that operates the operation-receiving body, and a flexibility-provided section that allows displacement of the brake pedal and the linkage mechanism relative to the electric actuator in accordance with an operation of stepping the brake pedal between the brake pedal or the linkage mechanism and the electric actuator.

According to the present configuration, for example, when an unexpected abnormality such as a decrease in a hydraulic pressure occurs during autonomous traveling of the work vehicle in an unmanned state, the electric brake operating device activates the brake via the brake pedal and the linkage mechanism or via the linkage mechanism only in response to the emergency stop command based on the abnormality therein. Accordingly, it is possible to quickly brake and stop the work vehicle that is autonomously traveling in an unmanned state. In addition, unlike an electro-hydraulically-controlled brake operating device which operates the brake with oil from a hydraulic pump that is driven by engine power, the electric brake operating device can maintain the brake in the braking state even in a case where the engine stops and the hydraulic pressure decreases. Accordingly, for example, even in a case where the work vehicle in an unmanned state is emergently stopped in the engine stopped state at a sloping land that slopes in the travel direction thereof, it is possible to maintain the work vehicle in the braking-and-stopped state. Furthermore, when a stepping operation is performed on the brake pedal during manual driving of the work vehicle by the passenger, the braking operation of the brake in conjunction with the stepping operation can be performed smoothly without interference from the electric actuator because of the action of the flexibility-provided section. That is, it is possible for the brake system to include a brake operation system for an emergency stop, which is for enabling the work vehicle to quickly brake and stop when an abnormality occurs in the work vehicle that is autonomously traveling in an unmanned state and for maintaining the work vehicle in the braking-and-stopped state even in an engine stopped state, without causing any problem for a passenger manually driving the work vehicle.

The second characteristic configuration of the present invention is that, because of activation of the electric actuator, a state of the brake operating device transitions between a non-activation state in which the brake is not operated and a maximum activation state in which an operation amount of the brake is maximized and that the brake system comprises a state detection sensor configured to detect the brake operating device being in the non-activation state and in the maximum activation state.

According to the present configuration, by use of the detection by the state detection sensor, it is possible to easily check the activation of the brake operating device before controlling the work vehicle to autonomously travel in an unmanned state and to easily monitor the state of the brake operating device of the work vehicle autonomously traveling in an unmanned state.

The third characteristic configuration of the present invention is that the electric actuator is an electric motor that outputs rotational power, that the brake operating device includes a housing case, which is attached to a fixed section of a vehicle body, and a deceleration gear set that decelerates the rotational power from the electric motor, and that the electric motor and the deceleration gear set are housed in the housing case.

According to the present configuration, it is possible to attach the electric motor, the deceleration gear set, and the housing case of the brake operating device in an integrated state to the fixed section of the vehicle body. Further, after attaching them, by linking the electric motor side with the brake pedal or the linkage mechanism via the operation-receiving body, etc., it is possible to mount the brake operating device to the vehicle body in such a state where the brake operating device can operate the brake. That is, it is possible to easily mount the brake operating device to the vehicle body without significantly changing the configuration of the vehicle body side, and accordingly, it is possible to mount the brake operating device to the work vehicle at a later timing. As a result, the brake operating device can be easily mounted to the vehicle body, and it is possible to easily perform maintenance such as replacement of the brake operating device in a case where a problem occurs to the brake operating device.

The fourth characteristic configuration of the present invention is that the brake operating device includes a linkage pin that links the operation-receiving body and an outer periphery of an output gear in the deceleration gear set via the flexibility-provided section, that the housing case includes a movement restricting part that restricts a movement range of the linkage pin between a non-operating position in which the brake is not operated and a maximum operating position in which an operation amount of the brake is maximized, and that the movement range of the linkage pin is set as a range in which the linkage pin crosses a virtual straight line, which passes through a connection point of the operation-receiving body connected to the brake pedal or the linkage mechanism and through a rotation center of the output gear, so as to move between the non-operating position and the maximum operating position.

According to the present configuration, in a case where the brake operating device activates the brake, forward rotational power is firstly transmitted from the electric motor to the output gear so that the output gear rotates in the braking direction, and, accordingly, the linkage pin moves from the non-operating position toward the maximum operating position on an arc trajectory. Here, as a matter of course, since the brake pedal is urged to return to the stepping release position, the electric motor performs a braking operation on the brake against the urging force imposed on the brake pedal in the first movement range, which is after the linkage pin passes through the play area including the non-operating position and until the linkage pin crosses the virtual straight line. Therefore, in the first movement range, the burden imposed on the electric motor becomes heavier as the linkage pin gets closer to the virtual straight line. However, as the linkage pin gets closer to the virtual straight line, the angle between the connection line, which is connecting the linkage pin and the rotation center of the output gear, and the operation-receiving body becomes narrower, and, accordingly, the urging force imposed on the brake pedal becomes less effective as force that returns the linkage pin to the non-operating position, so that the increase amount of the burden imposed on the electric motor decreases. Thereafter, when the linkage pin crosses the virtual straight line, the urging force imposed on the brake pedal is switched to a state of assisting the electric motor with the braking operation. Therefore, in the second movement range, which is after the linkage pin crosses the virtual straight line and until the linkage pin reaches the maximum operating position, the burden imposed on the electric motor becomes lighter as the linkage pin gets farther from the virtual straight line and closer to the maximum operating position. Further, in a state where the linkage pin has reached the maximum operating position, the linkage pin is urged to move in the braking direction by the urging force imposed on the brake pedal in a state where the movement in the braking direction is restricted by the movement restricting part. Accordingly, for example, in a case where the electric motor is broken or the output gear is damaged in a state where the linkage pin has crossed the virtual straight line and reached the second movement range, the linkage pin is moved to the maximum operating position and held in the maximum operating position by the urging force imposed on the brake pedal, so that it is possible to maintain the brake in the braking state so as to maintain the work vehicle in the braking-and-stopped state. As a result, it is possible to decrease the burden imposed on the electric motor in the braking operation performed by the brake operating device on the brake, and, in the meantime, in a case where the work vehicle is braking and stopping because of activation of the brake operating device, it is possible to maintain the work vehicle in the braking-and-stopped state regardless of whether the electric motor is broken or the output gear is damaged.

BRIEF DESCRIPTION OF DRAWINGS

FIG. 22 is a perspective view of a main part illustrating another embodiment in which a housing case, etc., in the electric brake operating device exemplified in the first embodiment are disposed in a front left side portion in the driving section.

DESCRIPTION OF EMBODIMENTS

First Embodiment

Hereinafter, as an example of a mode for carrying out the present invention, an explanation is given of the first embodiment in which the brake system for work vehicles according to the present invention is applied to a tractor, which is an example of the work vehicles, based on the drawings. Note that the brake system for work vehicles according to the present invention can be applied to a riding-type work vehicle other than a tractor, such as a riding-type mower, a riding-type rice transplanter, a combine, a haulage vehicle, a wheel loader, or a snowplow.

Figure 1:
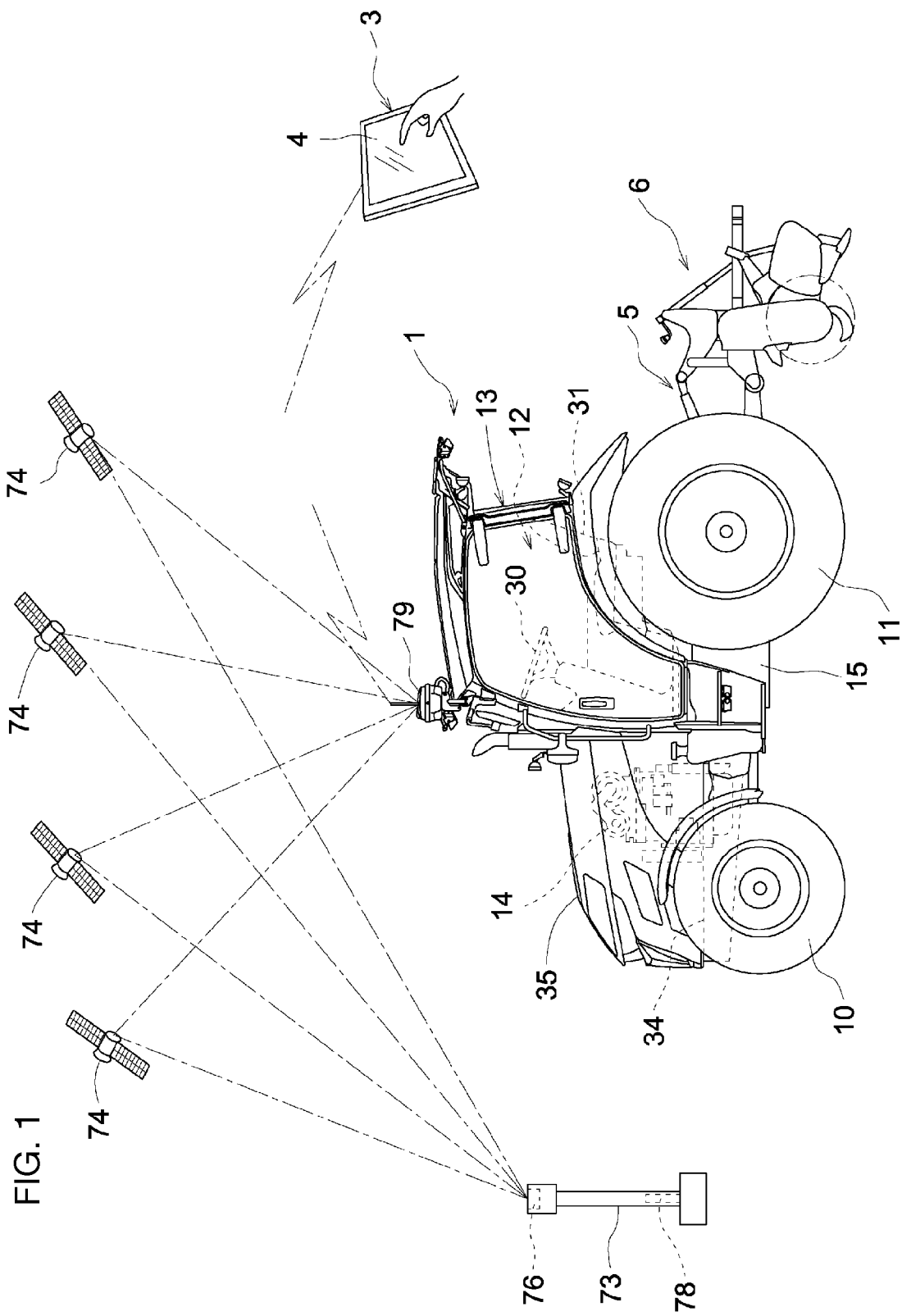
FIG. 1 is a diagram illustrating a schematic configuration of an autonomous travel system.
Figure 2:
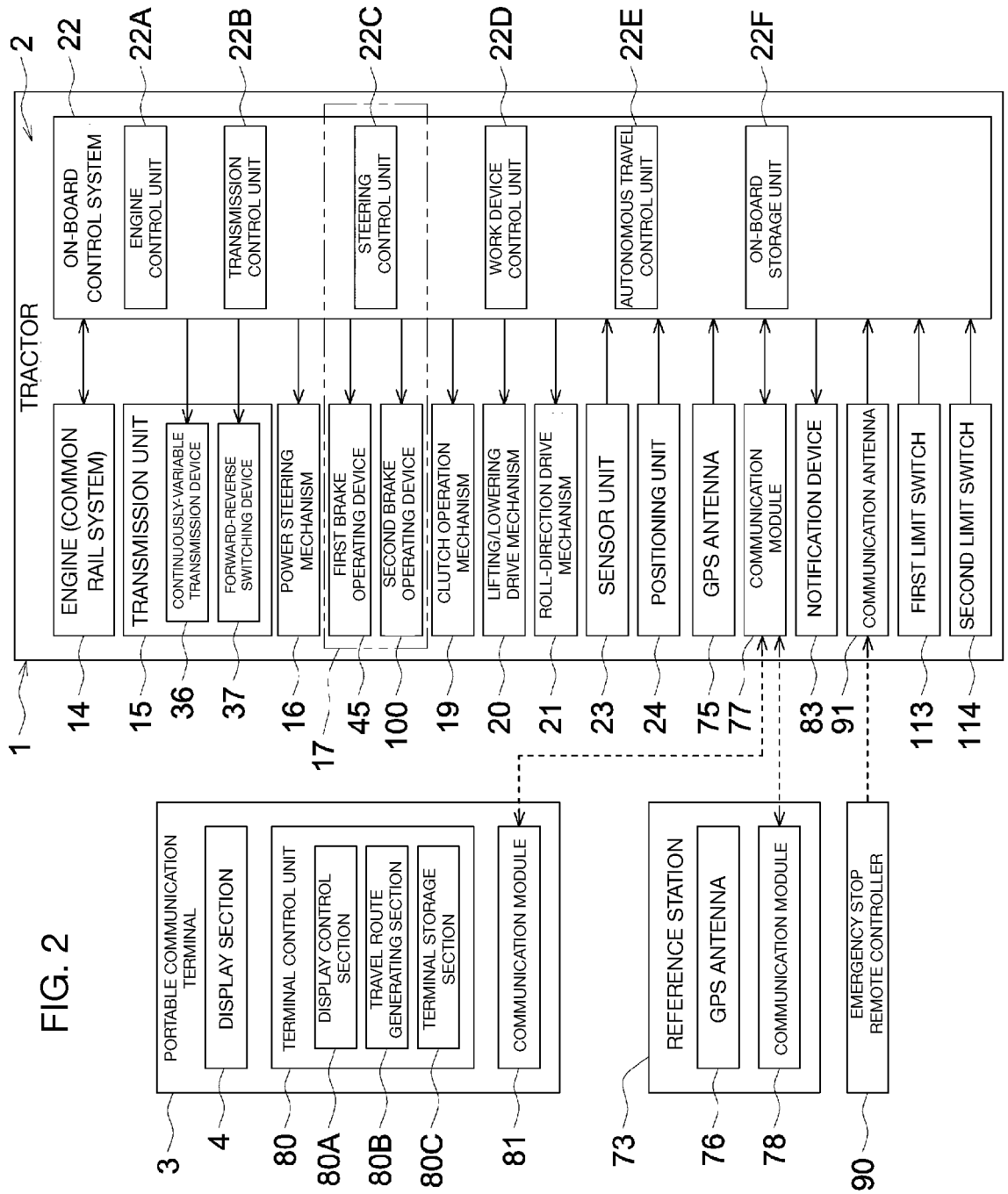
FIG. 2 is a block diagram illustrating a schematic configuration of the autonomous travel system.

As illustrated in FIG. 1 and FIG. 2, a tractor 1 exemplified in the present embodiment is a travel vehicle body configured to be capable of autonomously traveling in a field, which is an example of a work site, by use of an autonomous travel system for work vehicles. The autonomous travel system includes an autonomous travel unit 2 mounted on the tractor 1, a portable communication terminal 3 that has communication settings so as to be capable of communicating with the autonomous travel unit 2. As the portable communication terminal 3, it is possible to employ a smartphone, a tablet-type personal computer, or the like, which includes a multi-touch-type display section (for example, a liquid crystal panel) 4 on which information related to autonomous traveling or the like is displayed.

As illustrated in FIG. 1, the rear part of the tractor 1 is connected via a three-point link mechanism 5 to a rotary tillage device 6, which is an example of a work device, so that the rotary tillage device 6 can be lifted/lowered and rolled. Accordingly, this tractor 1 is configured to be capable of performing rotary tillage. Note that, instead of the rotary tillage device 6, it is possible that a work device such as a plow, a disc harrow, a cultivator, a subsoiler, a seeding device, a spraying device, or a mowing device is connected to the rear part of the tractor 1.

As illustrated in FIG. 1 through FIG. 4, the tractor 1 includes drivable and steerable left and right front wheels 10 and drivable left and right rear wheels 11 that function as wheel-type traveling devices, a cabin 13 that is forming a boarding-type driving section 12, an electronically-controlled diesel engine (hereinafter referred to as the engine) 14 including a common rail system, a transmission unit 15 for changing gears for the power from the engine 14, a full-hydraulic power steering mechanism 16 for steering the left and right front wheels 10, a brake system 17 for braking the left and right rear wheels 11, a work clutch for cutting the power transmission to the rotary tillage device 6, an electronically-controlled clutch operation mechanism 19 for enabling a hydraulic operation of the work clutch, an electro-hydraulically-controlled lifting/lowering drive mechanism 20 for driving the rotary tillage device 6 to be lifted/lowered, an electro-hydraulically-controlled roll-direction drive mechanism 21 for driving the rotary tillage device 6 in the roll direction, an on-board control system 22 including various control units, a sensor unit 23 including various kinds of sensors for detecting the engine rotational speed, vehicle speed, etc., a positioning unit 24 for measuring the current position, the current direction, etc., of the tractor 1, etc. Note that, for the engine 14, it is also possible to employ an electronically-controlled gasoline engine including an electronic governor or the like. For the power steering mechanism 16, it is also possible to employ an electric power steering mechanism including an electric motor or the like.

Figure 3:
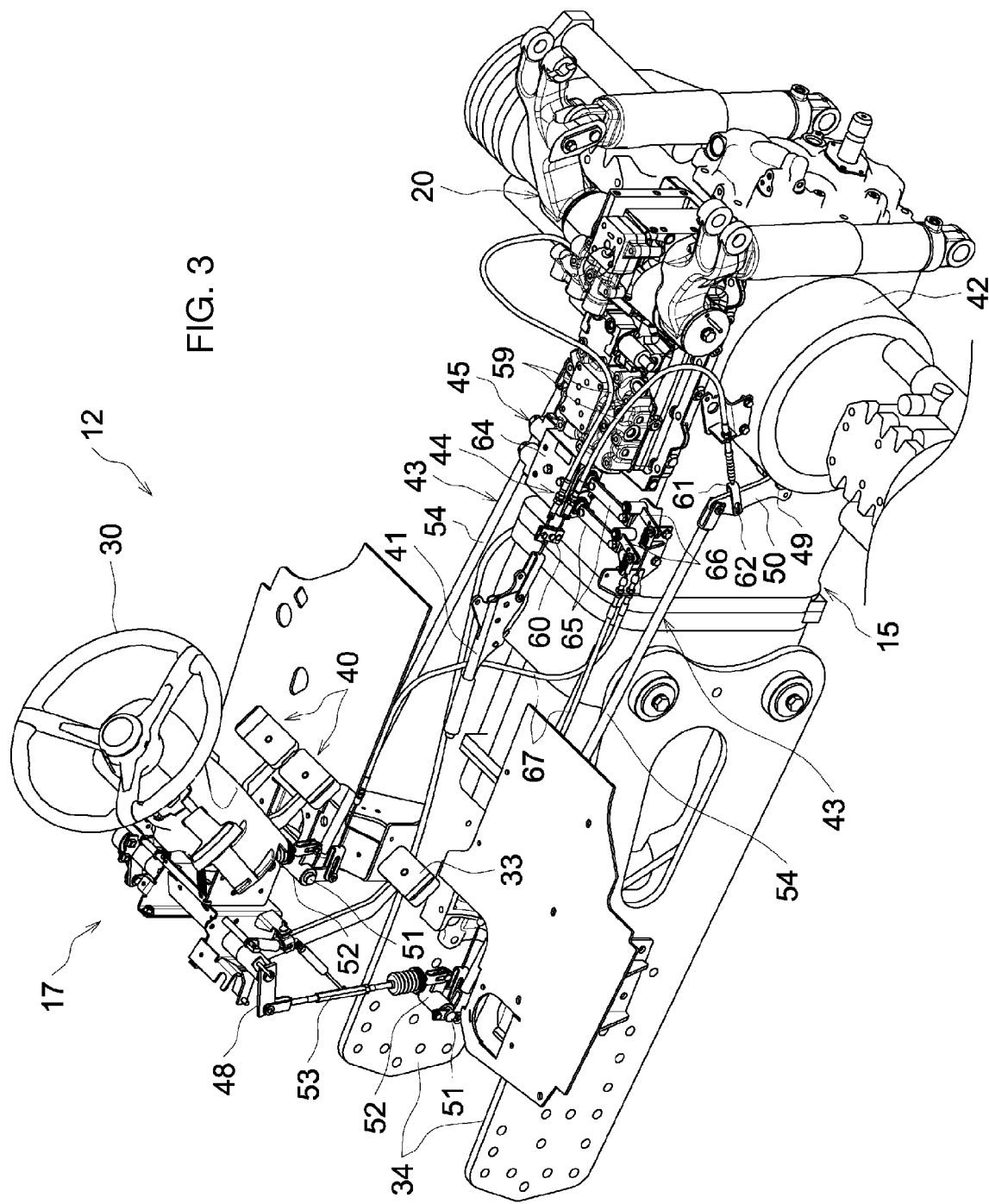
FIG. 3 is a perspective view of a main part illustrating a configuration of a brake system as viewed from the upper left rear.
Figure 4:
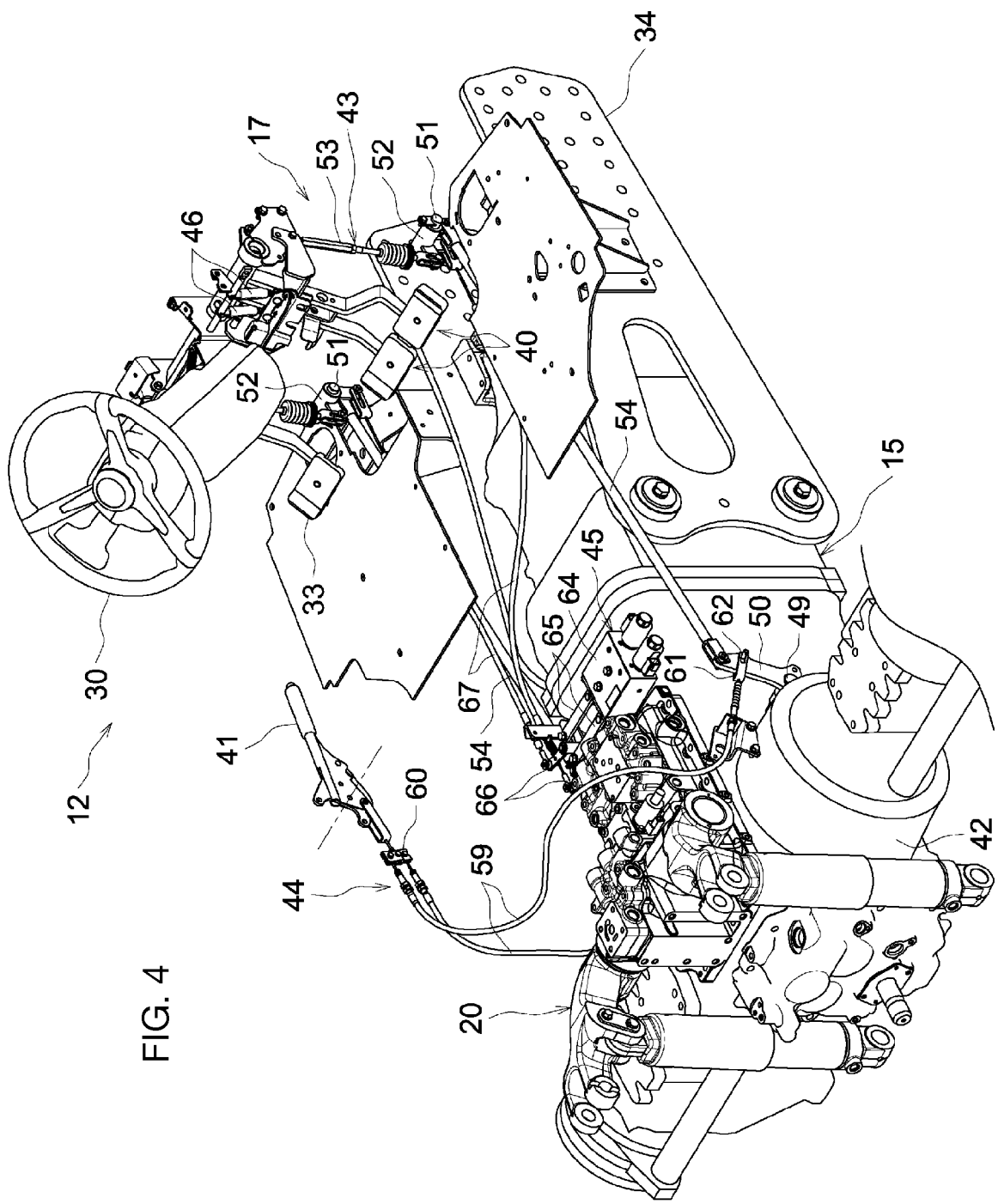
FIG. 4 is a perspective view of a main part illustrating a configuration of the brake system as viewed from the upper right rear.

As illustrated in FIG. 1 and FIG. 3 to FIG. 4, the driving section 12 is provided with various kinds of operation tools including a steering wheel 30 for enabling manual steering of the left and right front wheels 10 via the power steering mechanism 16, a seat 31 for a passenger, a multi-touch-type liquid crystal monitor as a display section for displaying information related to autonomous traveling, a clutch pedal 33, a transmission lever, etc.

As illustrated in FIG. 1, the cabin 13 is supported by a front frame 34, which is mounted on the front side of the tractor 1, and the transmission unit 15, which also serves as a rear frame, in an anti-vibration manner via an anti-vibration rubber or the like. The engine 14 is supported by the front frame 34 in an anti-vibration manner via an anti-vibration rubber or the like. The engine 14 is covered by the bonnet 35, which is mounted on the front side of the tractor 1.

As illustrated in FIG. 2, the transmission unit 15 includes an electronically-controlled continuously-variable transmission device (for example, I-HMT) 36 that changes gears for the power from the engine 14, an electro-hydraulically-controlled forward-reverse switching device 37 that switches the power, for which transmission has been performed by the continuously-variable transmission device 36, between the power for forward movement and the power for reverse movement, etc. Note that, instead of the continuously-variable transmission device 36, it is also possible that the transmission unit 15 includes an electro-hydraulically-controlled multi-step transmission device. For the continuously-variable transmission device 36, it is possible to employ a hydro-mechanical continuously-variable transmission device (HMT), a hydro-static continuously-variable transmission device (HST), a belt-type continuously-variable transmission device, or the like.

As illustrated in FIG. 3 to FIG. 4, the brake system 17 includes left and right brake pedals 40 and a parking brake lever 41 that are installed in the driving section 12, left and right brakes 42 that brake the left and right rear wheels 11, left and right first linkage mechanisms 43 that link the left and right brake pedals 40 and the left and right brakes 42 in such a manner as to allow the left and right brake pedals 40 and the left and right brakes 42 to operate in conjunction with each other, a second linkage mechanism 44 for parking brakes that links the parking brake lever 41 and the left and right brakes 42 in such a manner as to allow the parking brake lever 41 and the left and right brakes 42 to operate in conjunction with each other, an electro-hydraulically-controlled first brake operating device 45 that activates the brake 42 on the inner side of a turn in conjunction with steering of the left and right front wheels 10 at an angle equal to or larger than a set angle, etc. In a case where the passenger performs an operation of stepping either one or both of the left and right brake pedals 40, an operation of pulling the parking brake lever 41 up to a braking position, or steering of the steering wheel 30 to steer the left and right front wheels 10 at an angle equal to or larger than a set angle, the brake system 17 activates the corresponding brake 42 so as to brake the corresponding rear wheel 11. Each of the left and right brakes 42 internally includes an urging member such as a compression spring for urging each brake 42 to return from the braking state, in which the rear wheel 11 is braked, to the released state, in which the brake is released.

As illustrated in FIG. 2, the on-board control system 22 includes an engine control unit 22A that performs control related to the engine 14, a transmission control unit 22B that performs control related to the continuously-variable transmission device 36 and the forward-reverse switching device 37, a steering control unit 22C that performs control related to the power steering mechanism 16, the first brake operating device 45, etc., a work device control unit 22D that performs control related to a work device such as the rotary tillage device 6, an autonomous travel control unit 22E that performs control related to autonomous traveling, a non-volatile on-board storage unit 22F that stores a preset target travel route for autonomous traveling, etc. Each of the control units 22A through 22E includes an electronic control unit, in which a microcontroller, etc., are integrated, and various kinds of control programs, etc. The autonomous travel control unit 22E includes a display control module that controls activation of the above-described liquid crystal monitor and is mounted in the liquid crystal monitor.

The sensor unit 23 includes a rotation sensor that detects the engine rotational speed, a vehicle speed sensor that detects the vehicle speed of the tractor 1, a steering angle sensor that detects the steering angle of the front wheels 10, etc. In the tractor 1, each of the control units 22A through 22E, each sensor of the sensor unit 23, etc., are connected via CAN (Controller Area Network) so as to be capable of communicating with each other.

As illustrated in FIG. 3 through FIG. 6, in the brake system 17, the left and right brake pedals 40 are disposed side by side in a front lower part on the right side of the driving section 12. The left and right brake pedals 40 are urged to return to the stepping release position by the left and right tension springs 46. Each of the left and right brake pedals 40 includes a boss part 40A that is supported by a rotation shaft 47, which extends in the left-right direction in a front lower position of the steering wheel 30 so as to support the pedals, a pedal arm part 40B extending downward from the boss part 40A, and a pedal part 40C that is attached to the floating end portion of the pedal arm part 40B, etc. Regarding the brake pedal 40 on the right side, the boss part 40A thereof performs rotation relative to the rotation shaft 47, and a linkage arm part 40D extending forward/downward from the boss part 40A is included. Regarding the brake pedal 40 on the left side, the boss part 40A thereof integrally rotates via the rotation shaft 47 with a linkage arm 48 that is fixed to the left end part of the rotation shaft 47.

As illustrated in FIG. 3 to FIG. 4, the left and right brakes 42 are included in the transmission unit 15. Each of the left and right brakes 42 includes an operation shaft 49 that is projecting laterally outward from the vehicle body at the front end part thereof, an operation arm 50 that is fixed to the protruding end part of the operation shaft 49, etc.

As illustrated in FIG. 3 through FIG. 6, each of the left and right first linkage mechanisms 43 includes a boss member 52 that is supported in a rotatable manner by a left or right fixed shaft 51 extending in the left-right direction at a lower position of the rotation shaft 47, a first linkage rod 53 extending in the up-down direction between the linkage arm part 40D of the brake pedal 40 on the right side or the linkage arm 48 and a first arm part 52A of the boss member 52, a second linkage rod 54 extending in the front-back direction between a second arm part 52B of the boss member 52 and the operation arm 50 of the brake 42, etc. The first linkage mechanism 43 on the left side includes the rotation shaft 47 and the linkage arm 48 described above. That is, the left and right first linkage mechanisms 43 are configured to be a rod linkage type in which the left and right brake pedals 40 are linked with the left and right brakes 42 via the first linkage rods 53, the second linkage rods 54, etc.

With the above-described configuration, upon a stepping operation on the brake pedal 40 on the right side only, the operational force thereof is transmitted to the operation arm 50 of the brake 42 on the right side via the first linkage mechanism 43 on the right side, so that the brake system 17 is switched to the right-side braking state in which the brake 42 on the right side brakes the rear wheel 11 on the right side. Thereafter, in a case where the stepping operation of the brake pedal 40 on the right side is released, the right-side braking state is switched to the released state. Upon a stepping operation on the brake pedal 40 on the left side only, the operational force thereof is transmitted to the operation arm 50 of the brake 42 on the left side via the first linkage mechanism 43 on the left side, so that the brake system 17 is switched to the left-side braking state in which the brake 42 on the left side brakes the rear wheel 11 on the left side. Thereafter, in a case where the stepping operation on the brake pedal 40 on the left side is released, the left-side braking state is switched to the released state. Upon a stepping operation on both of the left and right brake pedals 40, the operational force thereof is transmitted to the operation arms 50 of the left and right brakes 42 via the left and right first linkage mechanisms 43, so that the brake system 17 is switched to the braking state in which the left and right brakes 42 brake the left and right rear wheels 11. Thereafter, in a case where the stepping operation on the left and right brake pedals 40 is released, the braking state is switched to the released state.

Accordingly, in a case where the passenger manually drives the tractor 1, it is possible for the passenger to perform a stepping operation on the brake pedal 40 on the inner side of a turn while operating the steering wheel 30 in the turning direction, in order to perform a braking turn by which the turning radius of the tractor 1 becomes small. In addition, it is possible for the passenger to perform a stepping operation on both of the left and right brake pedals 40, in order to brake to decelerate or stop the tractor 1 while maintaining the straight-ahead posture.

Figure 5:
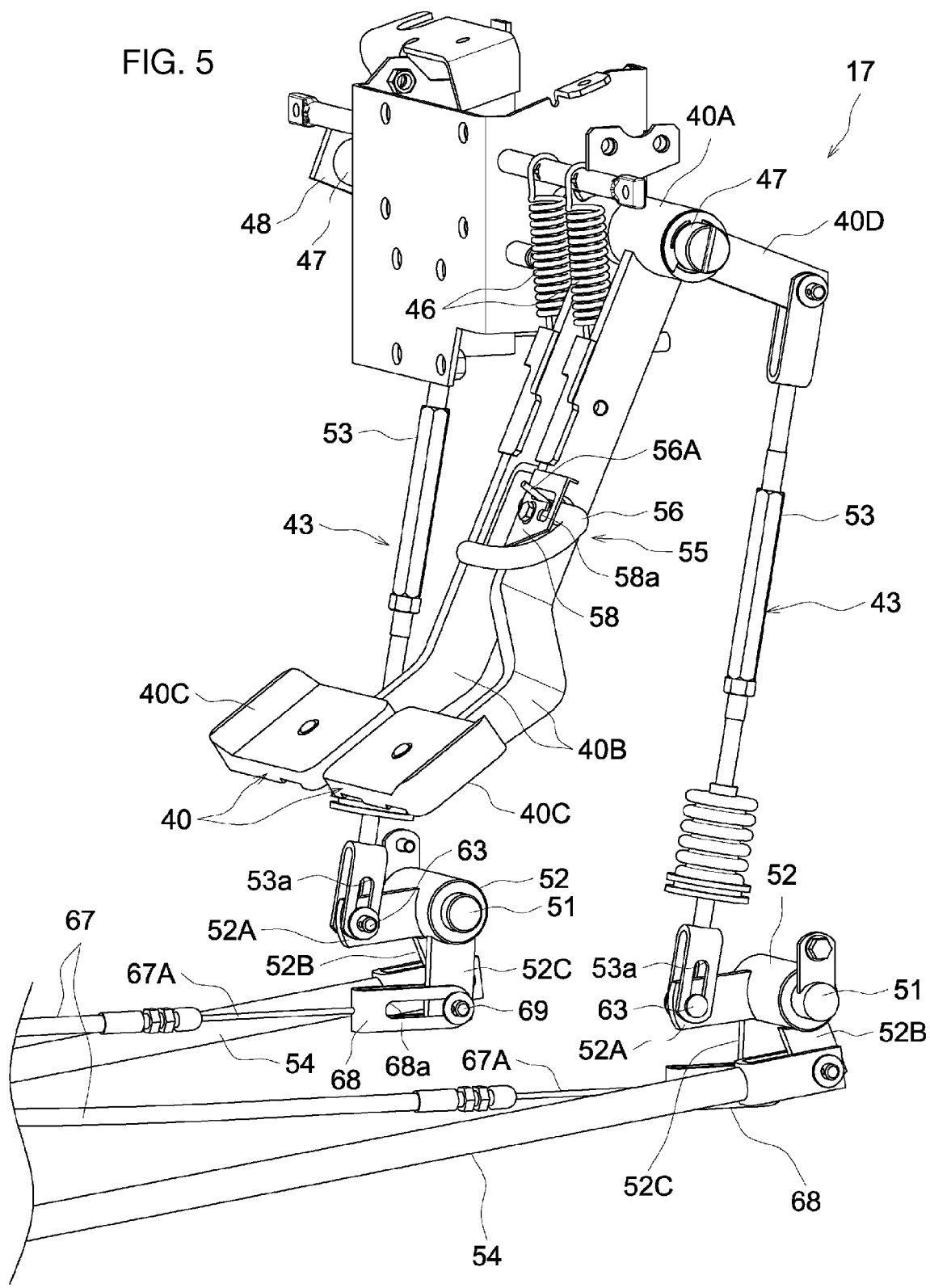
FIG. 5 is a perspective view of a main part illustrating a configuration in the vicinity of brake pedals in the brake system.
Figure 6:
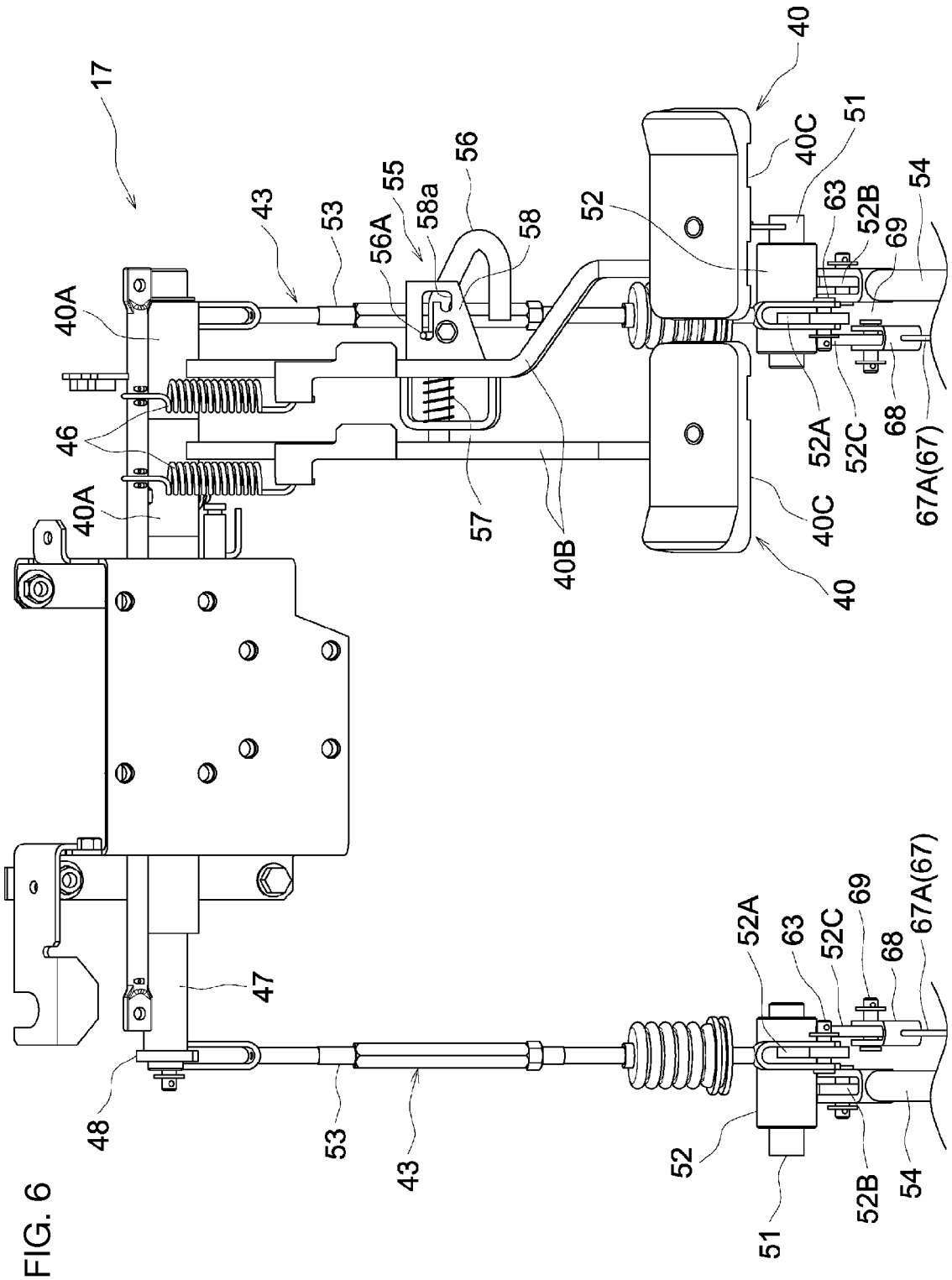
FIG. 6 is a rear view of a main part illustrating a configuration in the vicinity of the brake pedals in the brake system.
Figure 7:
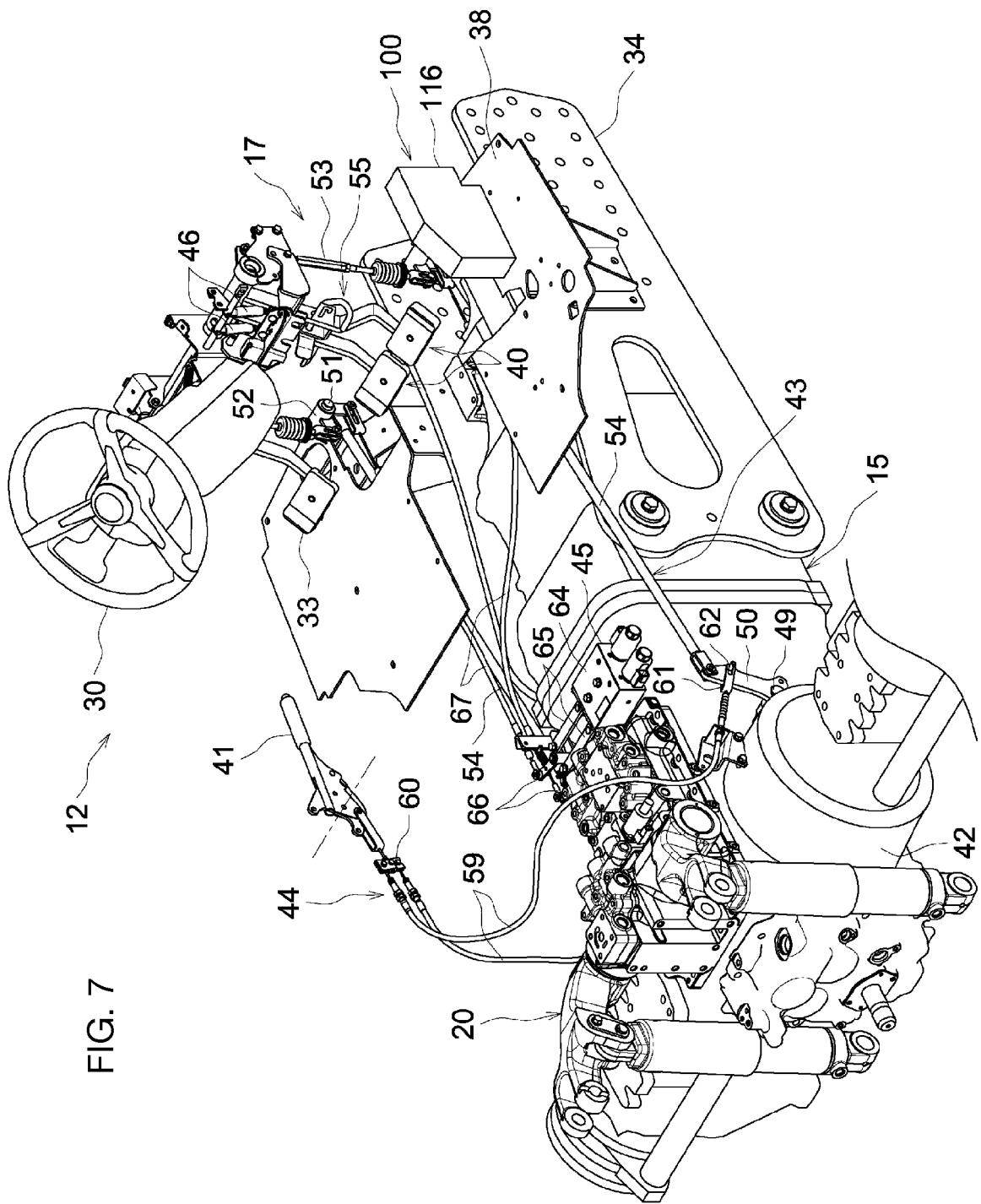
FIG. 7 is a perspective view of a main part illustrating a configuration of a brake system including an electric brake operating device exemplified in the first embodiment as viewed from the upper right rear.

As illustrated in FIG. 5 to FIG. 6, the brake system 17 includes a connection mechanism 55 that is capable of switching between a connected state, in which the left and right brake pedals 40 are connected, and a released state, in which the connection is released. The connection mechanism 55 includes an operation rod 56 that is supported by the brake pedal 40 on the right side so as to be movable in the left-right direction, a compression spring 57 that protrudes so as to urge the left end part of the operation rod 56 toward the brake pedal 40 on the left side, a guide plate 58 for guiding a guided part 56A of the operation rod 56, etc. The guide plate 58 is formed with a J-shaped guide hole 58a for guiding the guided part 56A of the operation rod 56 between the connected position and the released position. The brake pedal 40 on the left side is formed with a through hole 40E (see FIG. 8 and FIG. 11 to FIG. 12) to which the left end part of the operation rod 56 is inserted in a case where the guided part 56A of the operation rod 56 is located at the connected position.

With the above-described configuration, in a case where the operation rod 56 is operated so that the guided part 56A of the operation rod 56 is located at the connected position, the left end part of the operation rod 56 is inserted to the through hole 40E of the brake pedal 40 on the left side, so that the connection mechanism 55 is switched to the connected state in which the left and right brake pedals 40 are connected, and this connected state is held by the compression spring 57. In a case where the operation rod 56 is operated so that the guided part 56A of the operation rod 56 is located at the released position, the left end part of the operation rod 56 is pulled out from the through hole 40E of the brake pedal 40 on the left side, so that the connection mechanism 55 is switched to the released state in which the connection of the left and right brake pedals 40 is released, and the released state is held by the compression spring 57.

Accordingly, in a case where the passenger manually drives the tractor 1 inside a field, it is possible for the passenger to operate the operation rod 56 so as to switch the connection mechanism 55 to the released state, in order to perform a necessary braking turn when traveling inside the field. In addition, in a case where the passenger manually drives the tractor 1 outside a field, it is possible for the passenger to operate the operation rod 56 so as to switch the connection mechanism 55 to the connected state, in order to avoid an unnecessary braking turn from being performed when traveling outside the field.

In the brake system 17, the parking brake lever 41 is disposed to the left of the seat 31 in the driving section 12. The parking brake lever 41 is configured to be a two-position switching type that switches and holds the left and right brakes 42 in two positions, that is, a braking position on the upper side for switching to the braking state and a released position on the lower side for switching to the released state.

As illustrated in FIG. 3 to FIG. 4, the second linkage mechanism 44 for parking brakes includes left and right control cables 59, an equalizer unit 60 for connecting end parts of inner cables of the left and right control cables 59 to the parking brake lever 41, left and right link plates 61 and linkage pins 62 for connecting the other end parts of the left and right inner cables to the operation arms 50 of the left and right brakes 42, etc. That is, the second linkage mechanism 44 is configured to be a cable linkage type in which the parking brake lever 41 is linked with the left and right brakes 42 via the left and right control cables 59, etc. The left and right link plates 61 includes elongated holes through which the linkage pins 62 fixed to the left and right operation arms 50 are inserted, so that these elongated holes function as flexibility-provided sections that allow the left and right operation arms 50 to change positions thereof relative to the left and right link plates 61 according to a stepping operation of the left and right brake pedals 40.

With the above-described configuration, in a case where an operation of pulling up the parking brake lever 41 from the released position on the lower side to the braking position on the upper side is performed and the parking brake lever 41 is held in the braking position, the operational force thereof is transmitted to the operation arms 50 of the left and right brakes 42 via the second linkage mechanism 44, so that the brake system 17 is switched to a parking brake state in which the left and right brakes 42 brake the left and right rear wheels 11 and this braking state is maintained. Thereafter, in a case where an operation of pushing down the parking brake lever 41 from the braking position on the upper side to the released position on the lower side is performed and the parking brake lever 41 is held in the released position, the parking brake state is switched to the released state.

As illustrate in FIG. 5, in the left and right first linkage mechanisms 43, the lower end part of each first linkage rod 53 is formed with an elongated hole 53*a* that is long in the up-down direction, and, to each of these elongated holes 53*a*, a linkage pin 63 that is fixed to the first arm part 52A of the boss member 52 is inserted. As illustrated in FIG. 3 to FIG. 5, in the left and right first linkage mechanisms 43, in a case where the left and right brakes 42 are switched from the released state to the parking brake state by the operation of pulling up the parking brake lever 41, the left and right second linkage rods 54 are pulled rearward and the second arm parts 52B of the left and right boss members 52 swing and change positions rearward in conjunction with this switching, and, in conjunction with this swinging and changing positions, the first arm parts 52A of the left and right boss members 52 swing and change positions upward. Here, the elongated holes 53*a* of the first linkage rods 53 function as flexibility-provided sections that allow the left and right first arm parts 52A to swing and change positions thereof upward relative to the left and right first linkage rods 53, respectively. Accordingly, when the left and right brakes 42 are switched to the parking brake state by the operation of pulling up the parking brake lever 41, it is possible to avoid operability from deteriorating because of a heavy operation caused by the left and right brake pedals 40 being operating in conjunction with each other.

As illustrated in FIG. 3 to FIG. 6, in the brake system 17, the first brake operating device 45 includes a hydraulic unit 64 for automatic braking, which includes two solenoid valves and two hydraulic cylinders corresponding to the left and right brakes 42, a pair of push-pull links 65 that are pushed and pulled by the hydraulic unit 64, a pair of crank arms 66 that swing on vertical axes in conjunction with the pair of push-pull links 65, left and right control cables 67 extending from the pair of crank arms 66 toward the left and right boss members 52, left and right linkage pins 69 and left and right link plates 68 that connect the front end parts of the inner cables 67A in the left and right control cables 67 to the third arm parts 52C of the left and right boss members 52, etc. The hydraulic unit 64 is supplied with oil from a hydraulic pump driven by power from the engine 14. The left and right link plates 68 includes elongated holes 68*a* to which the linkage pins 69 fixed to the left and right third arm parts 52C are inserted, so that these elongated holes 68*a* function as flexibility-provided sections that allow the left and right third arm parts 52C to swing and change positions thereof relative to the left and right link plates 68 according to a stepping operation of the left and right brake pedals 40 or an operation of pulling up the parking brake lever 41.

As illustrated in FIG. 2, the brake system 17 includes the steering control unit 22C. In a case where a selection switch for automatic braking, which is installed in the driving section 12, is operated so that the automatic brake mode is selected, the steering control unit 22C executes automatic brake control so as to control activation of the hydraulic unit 64 in the first brake operating device 45, based on detection by a steering angle sensor, in order to operate the left and right brakes 42. In the automatic brake control, during the time in which the steering angles of the left and right front wheels 10 are smaller than a set angle, the steering control unit 22C maintains each solenoid valve of the hydraulic unit 64 in a discharged state in which oil is discharged from each hydraulic cylinder, in order to maintain the left and right hydraulic cylinders in a contracted state so as to maintain the left and right brakes 42 in the released state. Then, in a case where the steering angles of the left and right front wheels 10 reach or exceed the set angle, the solenoid valve corresponding to the rear wheel 11 on the inner side of the turn is switched to a supplied state in which oil is supplied to the hydraulic cylinder, in order to expand the hydraulic cylinder corresponding to the rear wheel 11 on the inner side of the turn so as to switch the brake 42 on the inner side of the turn to the braking state.

With the above-described configuration, in a case of manual driving with the automatic brake mode being selected, during the time in which the steering angles of the left and right front wheels 10 based on an operation of rotating the steering wheel 30 are smaller than a set angle, the first brake operating device 45 of the brake system 17 maintains the left and right brakes 42 in the released state. Accordingly, the turning state of the tractor 1 is maintained in a normal turning state in which the tractor 1 makes a turn with the turning radius corresponding to the steering angles of the left and right front wheels 10. Then, in a case where the steering angles of the left and right front wheels 10 based on an operation of rotating the steering wheel 30 reach or exceed the set angle, the first brake operating device 45 switches the brake 42 on the inner side of the turn to the braking state. Accordingly, the turning state of the tractor 1 is switched to a braking turn state in which the tractor 1 makes a turn with a turning radius that is smaller than the turning radius of the normal turning state. Thereafter, in a case where the steering angles of the left and right front wheels 10 based on an operation of rotating the steering wheel 30 become smaller than the set angle, the first brake operating device 45 switches the left and right brakes 42 to the released state. Accordingly, the turning state of the tractor 1 is switched to the above-described normal turning state.

That is, in manual driving, in a case where the driver selects the automatic brake mode, even though the driver does not perform a stepping operation on the brake pedal 40 on the inner side of a turn when making a turn in which the left and right front wheels 10 are steered to an angle equal to or larger than a set angle, the turning state of the tractor 1 is automatically switched by the brake system 17 between the normal turning state and the braking turn state, based on whether the left and right front wheels 10 are at an angle smaller than the set angle or at an angle equal to or larger than the set angle. As a result, the driver can easily perform the turning operation when making a small turn of the tractor 1 only by an operation of rotating the steering wheel 30.

As illustrated in FIG. 5, each of the left and right first linkage mechanisms 43 is formed with the elongated hole 53*a* that functions as a flexibility-provided section in the lower end part of the first linkage rod 53 as described above. Thus, even when the left and right brake pedals 40 are connected by the connection mechanism 55, in a case where the left and right front wheels 10 are steered to an angle equal to or larger than the set angle, the first brake operating device 45 can activate the brake 42 on the inner side of the turn, in order to switch the turning state of the tractor 1 to the braking turn state.

The positioning unit 24 includes a satellite navigation device for measuring the current position and the current direction of the tractor 1 by use of GPS (Global Positioning System), which is an example of a satellite positioning system (NNS: Navigation Satellite System), an inertial measurement device (IMU: Inertial Measurement Unit) for measuring the posture, the direction, etc., of the tractor 1 by use of a three-axis gyroscope, a three-direction acceleration sensor, and the like included therein, etc. The positioning methods using GPS include DGPS (Differential GPS), RTK-GPS (Real Time Kinematic GPS), etc. In the present embodiment, RTK-GPS, which is suitable for positioning of a movable object, is adopted. Therefore, as illustrated in FIG. 1, a reference station 73 that enables positioning by use of RTK-GPS is installed at a given position in the vicinity of the field.

As illustrated in FIG. 1 to FIG. 2, the tractor 1 and the reference station 73 respectively include GPS antennas 75 and 76 for receiving radio waves transmitted from GPS satellites 74 (see FIG. 1), communication modules 77 and 78 for enabling wireless communication of various kinds of data including positioning data between the tractor 1 and the reference station 73, etc. Accordingly, the satellite navigation device of the positioning unit 24 is capable of measuring the current position and the current direction of the tractor 1 with high precision, based on positioning data obtained by the GPS antenna 75 on the tractor side receiving radio waves from the GPS satellites 74 as well as positioning data obtained by the GPS antenna 76 on the reference station side receiving radio waves from the GPS satellites 74. In addition, since the positioning unit 24 includes the satellite navigation device and the inertial measurement device, it is possible to measure the current position, current direction, and attitude angles (yaw angle, roll angle, pitch angle) of the tractor 1 with high precision.

In this tractor 1, the inertial measurement device of the positioning unit 24, the GPS antenna 75, and the communication module 77 are included in the antenna unit 79 illustrated in FIG. 1. The antenna unit 79 is disposed on the upper part of the front side of the cabin 13 at the center in the left-right direction.

As illustrated in FIG. 2, the portable communication terminal 3 is provided with a terminal control unit 80 including an electronic control unit integrated with a microcontroller or the like, various kinds of control programs, etc., a communication module 81 for enabling wireless communication of various kinds of data including positioning data with the communication module 77 on the tractor side, etc. The terminal control unit 80 includes a display control section 80A that controls activation of the display section 4, a travel route generating section 80B that generates a target travel route for autonomous traveling, a non-volatile terminal storage section 80C that stores a target travel route generated by the travel route generating section 80B, etc.

The target travel route includes various kinds of travel route sections such as multiple work path sections that are arranged and set parallelly at a fixed interval corresponding to the work width of the tractor 1, multiple turning path sections that are not for working but connect an end point and a start point of adjacent work path sections according to the traveling order, etc., as well as an appropriate engine rotational speed, an appropriate vehicle speed, a travel direction of the tractor 1, a front wheel steering angle at a turning path section, etc., which are set according to travel types of the tractor 1 in the various kinds of travel route sections.

The autonomous travel control unit 22E switches the driving mode of the tractor 1 from a manual mode to an automatic mode in a case where various kinds of conditions for starting autonomous traveling are satisfied in a state where a switch for selecting a driving mode, which is installed in the driving section 12, has been operated so that the automatic mode is selected. After switching the driving mode of the tractor 1 to the automatic mode, in a case where the display section 4 of the portable communication terminal 3 is operated by the user for a command to start autonomous traveling, the autonomous travel control unit 22E starts autonomous travel control, in which the tractor 1 is controlled to autonomously travel along a target travel route while obtaining the current position of the tractor 1 by use of the positioning unit 24.

The autonomous travel control performed by the autonomous travel control unit 22E includes an engine autonomous control process for sending a control command for autonomous travel related to the engine 14 to the engine control unit 22A, a transmission autonomous control process for sending a control command for autonomous travel related to the continuously-variable transmission device 36, the forward-reverse switching device 37, etc., to the transmission control unit 22B, a steering autonomous control process for sending a control command for autonomous travel related to steering to the steering control unit 22C, a working autonomous control process for sending a control command for autonomous travel related to the work device such as the rotary tillage device 6 to the work device control unit 22D, etc.

In the engine autonomous control process, the autonomous travel control unit 22E sends an engine start command for commanding the start of the engine 14 based on satisfaction of an engine start condition, an engine stop command for commanding the stop of the engine 14 based on satisfaction of an engine stop condition, an engine rotational speed change command for commanding a change of the engine rotational speed based on an appropriate engine rotational speed included in the target travel route or the like, etc., to the engine control unit 22A. In the transmission autonomous control process, the autonomous travel control unit 22E sends a transmission operation command for commanding a transmission operation of the continuously-variable transmission device 36 based on an appropriate vehicle speed included in the target travel route or the like, a forward-reverse switch command for commanding a forward-reverse switch operation of the forward-reverse switching device 37 based on the travel direction of the tractor 1 included in the target travel route or the like, a neutral switch command for commanding the forward-reverse switching device 37 to switch to the neutral state based on a stopping position of the tractor 1 included in the target travel route or the like, etc., to the transmission control unit 22B. In the steering autonomous control process, the autonomous travel control unit 22E sends a steering command for commanding steering of the left and right front wheels 10 based on a front wheel steering angle included in the target travel route or the like, etc., to the steering control unit 22C. In the working autonomous control process, the autonomous travel control unit 22E sends a working start command for commanding the rotary tillage device 6 to switch to the working state based on a working start point included in the target travel route, a working stop command for commanding the rotary tillage device 6 to switch to the non-working state based on a working stop point included in the target travel route, etc., to the work device control unit 22D.

The engine control unit 22A executes an autonomous engine start control for autonomously starting the engine 14, an autonomous engine stop control for autonomously stopping the engine 14, an autonomous engine rotational speed change control for autonomously changing the engine rotational speed, etc., according to various kinds of control commands related to the engine 14, which are sent from the autonomous travel control unit 22E in the above-described engine autonomous control process.

The transmission control unit 22B executes an autonomous transmission control for controlling activation of the continuously-variable transmission device 36 in order to optimize the vehicle speed of the tractor 1, an autonomous forward-reverse switch control for controlling activation of the forward-reverse switching device 37 in order to switch the travel direction of the tractor 1, an autonomous stop control for neutralizing the forward-reverse switching device 37 in order to stop traveling of the tractor 1, etc., according to various kinds of control commands related to the continuously-variable transmission device 36, the forward-reverse switching device 37, etc., which are sent from the autonomous travel control unit 22E in the above-described transmission autonomous control process.

The steering control unit 22C executes an autonomous steering control for controlling activation of the power steering mechanism 16 in order to steer the left and right front wheels 10, an autonomous braking turn control for activating the first brake operating device 45 in order to activate the brake 42 on the inner side of the turn in a case where the left and right front wheels 10 are steered to an angle equal to or larger than the set angle, etc., according to the steering command, which is sent from the autonomous travel control unit 22E in the above-described steering autonomous control process.

The work device control unit 22D executes an autonomous working start control for controlling activation of the lifting/lowering drive mechanism 20 and the clutch operation mechanism 19 in order to lower the rotary tillage device 6 down to the working height and activate the rotary tillage device 6, an autonomous working stop control for stopping the rotary tillage device 6 and lifting the rotary tillage device 6 up to the non-working height, etc., according to various kinds of control commands related to the rotary tillage device 6, which are sent from the autonomous travel control unit 22E in the above-described working autonomous control process. In addition, in the working state in which the rotary tillage device 6 is lowered down to the working height and activated, the work device control unit 22D executes an autonomous tillage depth maintaining control for controlling activation of the lifting/lowering drive mechanism 20 in order to maintain the tillage depth of the rotary tillage device 6 to a set depth based on detection by a tillage depth sensor that detects the tillage depth of the rotary tillage device 6, an autonomous roll angle maintaining control for controlling activation of the roll-direction drive mechanism 21 in order to maintain the tilting posture of the rotary tillage device 6 in the roll direction to a set posture (for example, a horizontal posture) based on detection by an acceleration sensor (tilt sensor) of the inertial measurement device that detects the roll angle of the tractor 1, etc.

As described above, in this tractor 1, the autonomous travel unit 2 that appropriately controls activation of the rotary tillage device 6 while controlling the tractor 1 to autonomously travel along the target travel route is configured with the power steering mechanism 16, the clutch operation mechanism 19, the lifting/lowering drive mechanism 20, the roll-direction drive mechanism 21, the on-board control system 22, the sensor unit 23, the positioning unit 24, the communication module 77, etc.

The autonomous travel control performed by the autonomous travel control unit 22E includes an emergency stop process for emergently stopping the tractor 1 in a case where any of the conditions for an emergency stop is satisfied and an emergency stop notification process for providing a notification of an emergency stop. In the emergency stop process, the autonomous travel control unit 22E sends an emergency stop command to the engine control unit 22A, the steering control unit 22C, etc. In the emergency stop notification process, the autonomous travel control unit 22E activates the notification device 83 (see FIG. 2), such as an indicator for an emergency stop mounted on the vehicle body, and sends an emergency stop notification command to the portable communication terminal 3. The engine control unit 22A executes emergency engine stop control for emergently stopping the engine 14 in response to the emergency stop command from the autonomous travel control unit 22E. The steering control unit 22C executes emergency traveling stop control for activating the left and right brakes 42 in order to brake and stop the tractor 1 in response to the emergency stop command from the autonomous travel control unit 22E. The portable communication terminal 3 performs an emergency stop notification process, such as switching the display section 4 to a display screen for an emergency stop notification, based on an emergency stop notification command from the autonomous travel control unit 22E. The set conditions for an emergency stop include, for example, reduction of the engine rotational speed down to a value equal to or lower than a set lower limit value, obtainment of an emergency stop command that is sent from the portable communication terminal 3 or the emergency stop remote controller 90 (see FIG. 2) in response to a human operation of the portable communication terminal 3 or the emergency stop remote controller 90, an abnormality of the transmission control unit 22B, etc.

As illustrated in FIG. 2 and FIG. 7 to FIG. 12, the brake system 17 includes an electric second brake operating device 100 that activates the left and right brakes 42 in the emergency traveling stop control of the steering control unit 22C in response to an emergency stop command from the autonomous travel control unit 22E. The second brake operating device 100 is disposed to the right of the brake pedal 40 on the right side in the driving section 12. The second brake operating device 100 includes an operation-receiving body 101 that is connected to the brake pedal 40 on the right side, an electric actuator 102 that operates the operation-receiving body 101 in the front-back direction, a flexibility-provided section 103 that is located between the brake pedal 40 on the right side and the electric actuator 102 so as to allow the brake pedal 40 on the right side, etc., to change positions thereof relative to the electric actuator 102 in accordance with a stepping operation on the brake pedal 40, etc.

For a detailed description of the second brake operating device 100, as illustrated in FIG. 8 to FIG. 12, the operation-receiving body 101 includes a first member 104 and a second member 105 that are connected to the pedal arm part 40B of the brake pedal 40 on the right side, a damper 107 that is connected to the second member 105 so as to be swingable in the up-down direction via the connection pin 106 extending the left-right direction, a link plate 108 that is connected to the damper 107 so as to be adjustable in terms of its position in the front-back direction, etc. Furthermore, the link plate 108 is formed with an elongated hole 108a that is long in the front-back direction to function as the flexibility-provided section 103. For the electric actuator 102, an electric motor including a worm reducer 102A is employed. The electric motor 102 is switched by a control operation of the steering control unit 22C to a first operation state in which forward rotational power is output, a second operation state in which reverse rotational power is output, or an operation stopped state in which output of rotational power is stopped. Between the operation-receiving body 101 and the worm reducer 102A of the electric motor 102, there are provided a deceleration gear set 111, which includes an input gear 109 with a small diameter and an output gear 110 with a large diameter so as to further decelerate the power from the worm reducer 102A, and a linkage pin 112 for linking the outer periphery of the output gear 110 of the deceleration gear set 111 and the operation-receiving body 101 via the flexibility-provided section 103. The linkage pin 112 is fixed to the outer periphery of the output gear 110 in a state of being inserted through the elongated hole 108a of the link plate 108. By the forward rotational power from the electric motor 102, the linkage pin 112 moves from the non-operating position (see FIG. 8 to FIG. 11), in which the brake pedal 40 on the right side (the brake 42 on the right side) is not operated, to the maximum operating position (see FIG. 12), in which the operation amount of the brake pedal 40 on the right side (the brake 42 on the right side) is maximized, and, by the reverse rotational power from the electric motor 102, the linkage pin 112 moves from the maximum operating position to the non-operating position. The non-operating position of the linkage pin 112 is set so that the linkage pin 112 is located at the front end part of the elongated hole 101a when the brake pedal 40 on the right side is located at the stepping release position. Accordingly, when a stepping operation is performed on the brake pedal 40 on the right side, the forward movement of the operation-receiving body 101 relative to the linkage pin 112 according to this operation is allowed because of the clearance provided in the elongated hole 108a of the link plate 108. At the non-operating position of the linkage pin 112, the first limit switch 113 for detecting that the linkage pin 112 reaching the non-operating position is disposed. At the maximum operating position of the linkage pin 112, the second limit switch 114 for detecting that the linkage pin 112 reaching the maximum operating position is disposed.

In the emergency traveling stop control, the steering control unit 22C performs a forward rotational power output process, in which the electric motor 102 is switched from the operation stopped state to the first operation state in response to an emergency stop command from the autonomous travel control unit 22E so that forward rotational power is output from the electric motor 102, and a rotational power output stop process, in which the electric motor 102 is switched from the first operation state to the operation stopped state based on detection by the second limit switch 114 so that output of rotational power from the electric motor 102 is stopped.

With the above-described configuration, in a case where the tractor 1 is autonomously traveling in an unmanned state, when any of the conditions for an emergency stop is satisfied so that an emergency stop command is sent from the autonomous travel control unit 22E, the steering control unit 22C performs the forward rotational power output process in response to the emergency stop command. Here, in a case where the left and right brake pedals 40 are connected by the connection mechanism 55, the forward rotational power from the electric motor 102 moves the linkage pin 112 from the non-operating position to the maximum operating position, and, in conjunction with this movement, an operation of pulling the left and right brake pedals 40 from the stepping release position to the maximum stepping position is performed against the actions of the left and right tension springs 46. Accordingly, the forward rotational power from the electric motor 102 is transmitted to the operation arms 50 of the left and right brakes 42 via the left and right brake pedals 40 and the left and right first linkage mechanisms 43, so that the left and right brakes 42 are switched from the released state to the braking state against the actions of internal urging members. As a result, it is possible to quickly brake and stop the tractor 1 that is autonomously traveling in an unmanned state.

Further, in a case where the linkage pin 112 reaches the maximum operating position, the steering control unit 22C performs the rotational power output stop process based on the detection by the second limit switch 114, so that output of the forward rotational power from the electric motor 102 is stopped. Then, the linkage pin 112 stops moving in the maximum operating position, and, further, the linkage pin 112 is maintained in the maximum operating position by the action of the worm reducer 102A. Accordingly, the movement of the left and right brake pedals 40 in the stepping releasing direction due to the actions of the left and right tension springs 46 is prevented. As a result, it is possible to maintain the left and right brakes 42 in the braking state and to maintain the tractor 1 in the braking-and-stopped state.

In addition, since the left and right brake pedals 40 and the left and right first linkage mechanisms 43 are highly reliable ones that are unlikely to cause problems even with frequent uses in manual operations by the passenger, it is possible to reliably brake and stop the tractor 1 in an unmanned state without complicating the linkage structure due to installation of dedicated linkage mechanisms between the second brake operating device 100 and the left and right brakes 42.

Moreover, unlike the electro-hydraulically-controlled first brake operating device 45 which operates the left and right brakes 42 with oil from the hydraulic pump that is driven by engine power, the second brake operating device 100 is capable of maintaining the left and right brakes 42 in the braking state even in a case where the engine 14 is stopped and the hydraulic pressure decreases. Accordingly, it is possible to maintain the tractor 1 in the braking-and-stopped state even though the emergency engine stop control has been executed by the engine control unit 22A in response to an emergency stop command from the autonomous travel control unit 22E so that the engine 14 has been emergently stopped. As a result, even in a case where the emergency stopping position of the tractor 1 is a sloping land that slopes in the travel direction of the tractor 1, it is possible to avoid the possibility that the tractor 1 unexpectedly moves down the slope.

Furthermore, when a stepping operation is performed on the brake pedal 40 on the right side or on the left and right brake pedals 40 during manual driving of the tractor 1 by the passenger, the braking operation on the brake 42 on the right side or the left and right brakes 42 in conjunction with the stepping operation can be performed smoothly without interference from the electric motor 102 because of the action of the flexibility-provided section 103.

In addition, since the second brake operating device 100 is disposed in a right-side area of the driving section 12, which is not frequently used for getting on and off the driving section 12 because of many operation tools such as the left and right brake pedals 40 and an accelerator pedal disposed therein, it is possible to avoid deterioration of the convenience for getting on and off the driving section 12 from the left side, which is frequently used for getting on and off the driving section 12.

That is, it is possible for the brake system 17 to include a brake operation system for an emergency stop, which is for enabling the tractor 1 to quickly brake and stop in a case where an abnormality occurs in the tractor 1 while autonomously traveling in an unmanned state and for maintaining the tractor 1 in the braking-and-stopped state even in an engine stopped state, without causing any problem for a passenger manually driving the tractor 1 or a passenger getting on and off the driving section 12 from the left side.

After performing the above-described emergency stop process, the autonomous travel control unit 22E performs an emergency stop release process in a case where the power source is turned on again by an operation of a key switch included in the driving section 12. In the emergency stop release process, the autonomous travel control unit 22E sends an emergency stop release command to the engine control unit 22A. The engine control unit 22A allows the engine 14 to start in response to the emergency stop release command from the autonomous travel control unit 22E.

Regarding the second brake operating device 100, as described above, since the operation-receiving body 101 includes the second member 105 that is connected to the brake pedal 40 on the right side, the damper 107 that is connected to the second member 105 via the connection pin 106, etc., it is possible to release the connection of the second member 105, which is on the brake pedal side of the operation-receiving body 101, and the damper 107, which is on the electric motor side of the operation-receiving body 101, by pulling off the connection pin 106 in the state where the tractor 1 is braked and stopped due to activation of the left and right brakes 42 caused by an operation of the second brake operating device 100. Accordingly, the left and right brake pedals 40 return from the maximum stepping position to the stepping release position by the actions of the left and right tension springs 46. In addition, the left and right brakes 42 return from the braking state to the released state by the actions of the internal urging members.

That is, in the state where the tractor 1 has been urgently stopped because of the above-described control operation for an emergency stop, the power source is turned off by operating the key switch, and then the connection pin 106 is pulled off in order to release the connection of the second member 105, which is on the brake pedal side of the operation-receiving body 101, and the damper 107, which is on the electric motor side of the operation-receiving body 101. Then, after the release, by operating the key switch to turn on the power source again, it is possible to enable manual driving of the tractor 1 by the passenger. As a result, the passenger can manually drive the tractor 1 to move to a safe place, a repair factory, or the like.

Figure 13:
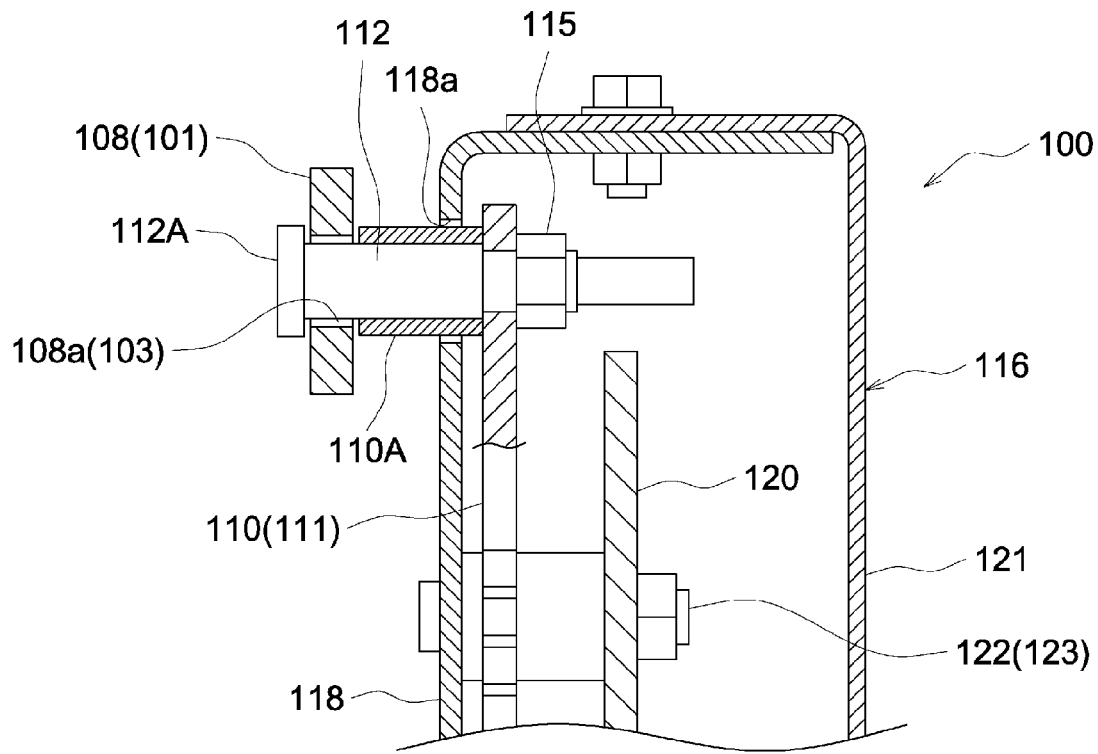
FIG. 13 is a vertical sectional rear view of a main part illustrating a linkage structure between an output gear and an operation-receiving body in the electric brake operating device exemplified in the first embodiment.

Note that, as illustrated in FIG. 13, a stepped bolt that is detachably fixed to the outer periphery of the output gear 110 by use of a nut 115 is adopted as the linkage pin 112 of the second brake operating device 100. The output gear 110 includes a boss part 110A that supports the linkage pin 112 at the position where the linkage pin 112 is fixed. Together with the head part 112A of the linkage pin 112, the boss part 110A regulates positional changes of the link plate 108 that is positioned therebetween in the left-right direction.

With the above-described configuration, in the state where the tractor 1 is braked and stopped due to activation of the left and right brakes 42 caused by an operation of the second brake operating device 100, it is possible to release the linkage of the output gear 110 of the deceleration gear set 111 and the operation-receiving body 101 by releasing the linkage pin 112 from being fixed to the output gear 110 by use of the nut 115 and pulling off the linkage pin 112 from the output gear 110. In this way, the left and right brake pedals 40 return from the maximum stepping position to the stepping release position due to the actions of the left and right tension springs 46 as in the above-described case in which the connection of the second member 105, which is on the brake pedal side of the operation-receiving body 101, and the damper 107, which is on the electric motor side of the operation-receiving body 101, is released by pulling off the connection pin 106. In addition, the left and right brakes 42 return from the braking state to the released state by the actions of the internal urging members.

That is, in the state where the tractor 1 has been urgently stopped because of the above-described control operation for an emergency stop, it is possible to enable the passenger to manually drive the tractor 1 by operating the key switch so as to turn off the power source and then pulling off the linkage pin 112 in order to release the linkage of the output gear 110 of the deceleration gear set 111 and the operation-receiving body 101, then operating the key switch after the release so as to turn on the power source again. As a result, the passenger can manually drive the tractor 1 to move to a safe place, a repair factory, or the like.

As illustrated in FIG. 8 to FIG. 12, the linkage pin 112 moves between the non-operating position (see FIG. 8 to FIG. 11) and the maximum operating position (see FIG. 12) by activation of the electric motor 102, so that the state of the second brake operating device 100 transitions between the non-activation state in which the left and right brakes 42 are not operated and the maximum activation state in which the operation amount of the left and right brakes 42 is maximized. Further, this transition can be detected by the first limit switch 113 and the second limit switch 114 described above. That is, the first limit switch 113 and the second limit switch 114 function as state detection sensors that detect the second brake operating device 100 being in the non-activation state and in the maximum activation state.

As a result, by use of the detection by the first limit switch 113 and the second limit switch 114, it is possible to easily check the activation of the second brake operating device 100 before controlling the tractor 1 to autonomously travel in an unmanned state and to easily monitor the state of the second brake operating device 100 of the tractor 1 autonomously traveling in an unmanned state.

As illustrated in FIG. 7 to FIG. 13, the second brake operating device 100 includes a housing case 116 attached to the floor plate (an example of a fixed section of the vehicle body) 38 of the driving section 12. The housing case 116 includes a base plate 117 that is detachably connected to the floor plate 38 via bolts, a left-side casing 118 that is connected to the floor plate 38 and the base plate 117 via bolts, a first support plate 119 that is welded to the inner side of the left-side casing 118, a second support plate 120 that is attached with a predetermined interval from a side wall of the left-side casing 118, a right-side casing 121 that is connected to the left-side casing 118 via bolts, etc. In the housing case 116, a housing space is formed between the left-side casing 118 and the right-side casing 121.

In the housing case 116, three stepped bolts 122 are fixed to the left-side casing 118 so as to extend from the side wall thereof in the rightward direction, and the second support plate 120 is attached to the side wall of the left-side casing 118 via these stepped bolts 122. Of the three stepped bolts 122, the stepped bolt 122 positioned at the center of the side wall is used as a support shaft 123 that supports the output gear 110 in a rotatable manner. In the side wall of the left-side casing 118, a guide hole 118a for guiding the linkage pin 112 between the non-operating position and the maximum operating position is formed in an arc shape centered at the support shaft 123. The electric motor 102 is attached to the first support plate 119 by use of three bolts 124. To an output shaft of the worm reducer 102A of the electric motor 102, the input gear 109 that meshes with the output gear 110 so as to operate in conjunction with each other is attached. The second support plate 120 is formed such that an end part thereof functions as a first receiving part 120A that receives the linkage pin 112 that has reached the non-operating position and the other end part thereof functions as a second receiving part 120B that receives the linkage pin 112 that has reached the maximum operating position. Further, the first limit switch 113 is attached to an end part of the second support plate 120, and the second limit switch 114 is attached to the other end part of the second support plate 120.

With the above-described configuration, in the second brake operating device 100, the electric motor 102, the deceleration gear set 111, the first limit switch 113, the second limit switch 114, etc., are housed in the housing case 116. Accordingly, it is possible to detachably attach the housing case 116, the electric motor 102, the deceleration gear set 111, the first limit switch 113, the second limit switch 114, etc., in an integrated state to the floor plate 38 as a driving unit. Further, after mounting the driving unit, by linking the operation-receiving body 101, which is connected to the brake pedal 40 on the right side, and the output gear 110, which is on the driving unit side, in such a state where the electric motor 102 can operate the operation-receiving body 101 via the flexibility-provided section 103 and the linkage pin 112, it is possible to mount the second brake operating device 100 to the driving section 12 in such a state where the second brake operating device 100 can operate the left and right brakes 42.

That is, it is possible to easily mount the second brake operating device 100 to the driving section 12 without significantly changing the configuration of the driving section 12, and, accordingly, it is possible to mount the second brake operating device 100 to the tractor 1 at a later timing. As a result, the second brake operating device 100 can be easily mounted to the tractor 1, and it is possible to easily perform maintenance such as replacement of the second brake operating device 100 in a case where a problem occurs to the second brake operating device 100.

In addition, in a case where the linkage pin 112 is pulled off in order to enable manual driving of the tractor 1 that has emergently stopped as described above, it is possible to detach the right-side casing 121 from the second brake operating device 100 by releasing the bolt-connection of the right-side casing 121 connected to the left-side casing 118. Accordingly, the right side of the housing case 116 can be widely opened, so that it is possible to easily operate the nut 115 in order to pull off the linkage pin 112.

Figure 10:
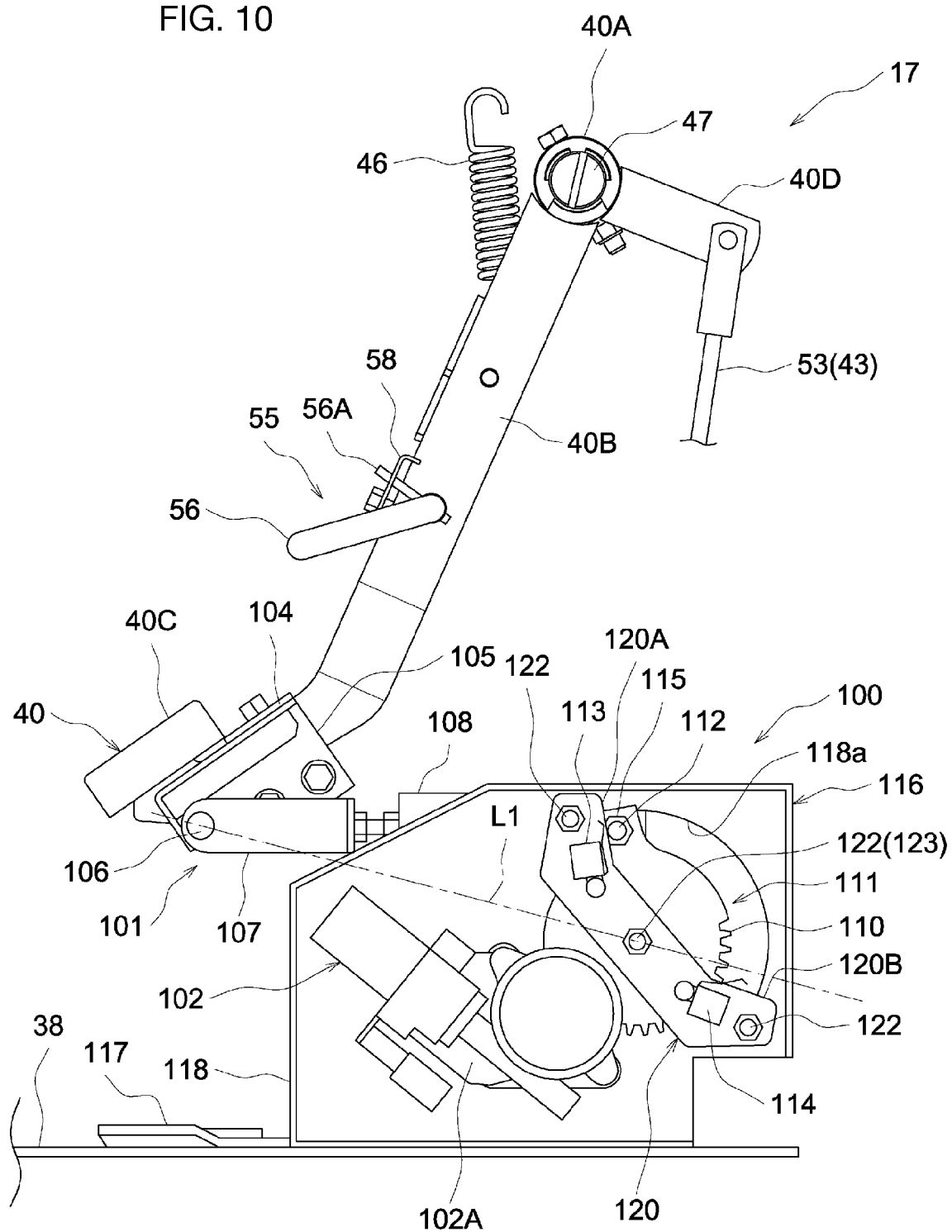
FIG. 10 is a right side view of a main part illustrating a configuration of the electric brake operating device exemplified in the first embodiment.
Figure 11:
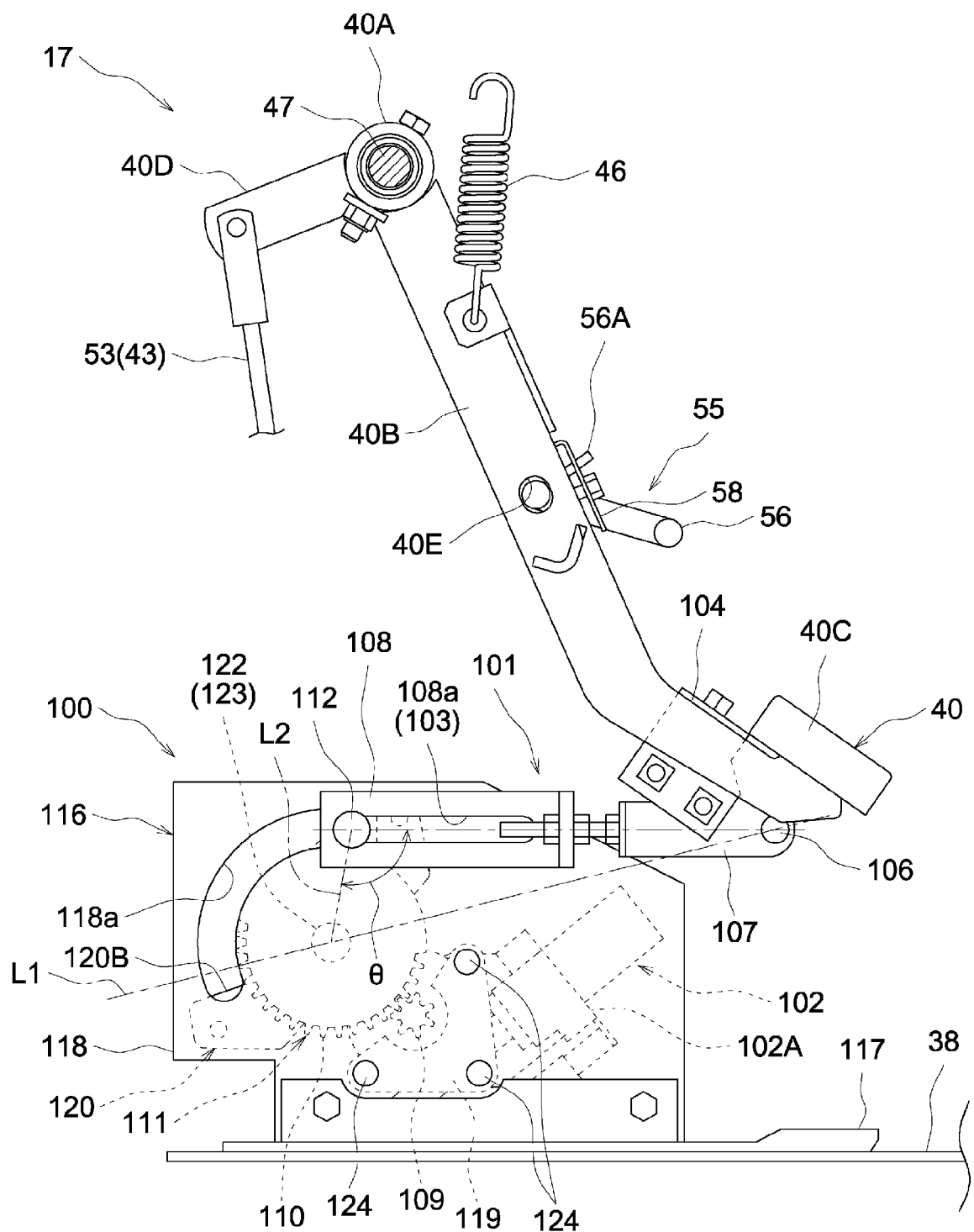
FIG. 11 is a vertical sectional left side view of a main part illustrating a non-activation state of the electric brake operating device exemplified in the first embodiment.
Figure 12:
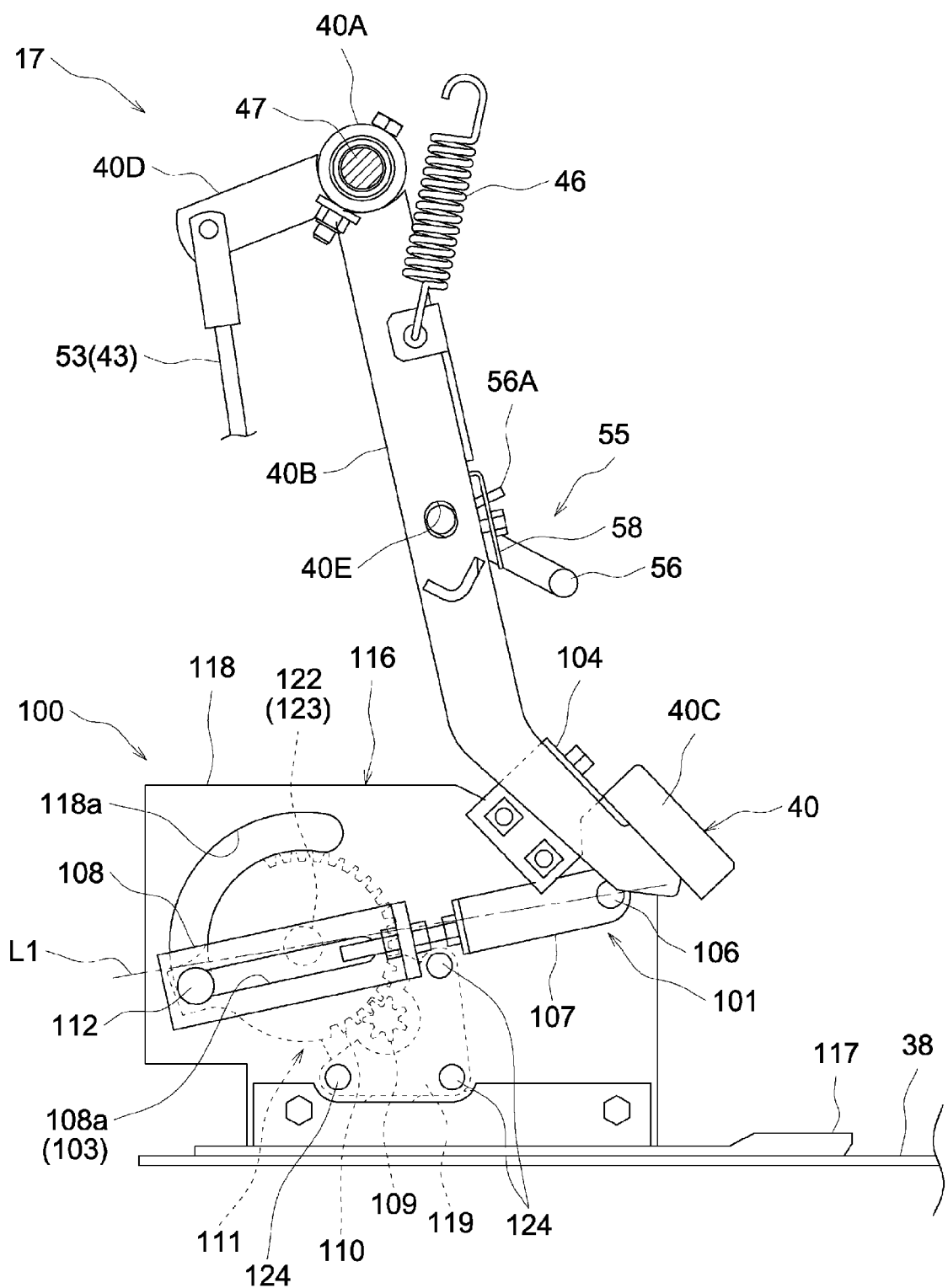
FIG. 12 is a vertical sectional left side view of a main part illustrating the maximum activation state of the electric brake operating device exemplified in the first embodiment.

As illustrated in FIG. 10 to FIG. 12, the first receiving part 120A and the second receiving part 120B of the second support plate 120 function as movement restricting parts that restrict the movement range of the linkage pin 112 between the non-operating position and the maximum operating position. The movement range of the linkage pin 112 is set as a range in which the linkage pin 112 moves between the non-operating position and the maximum operating position by crossing the virtual straight line L1 that passes through the connection pin 106, which is the connection point of the operation-receiving body 101 connected to the brake pedal 40 on the right side, and the support shaft 123, which is the rotation center of the output gear 110.

Figure 14:
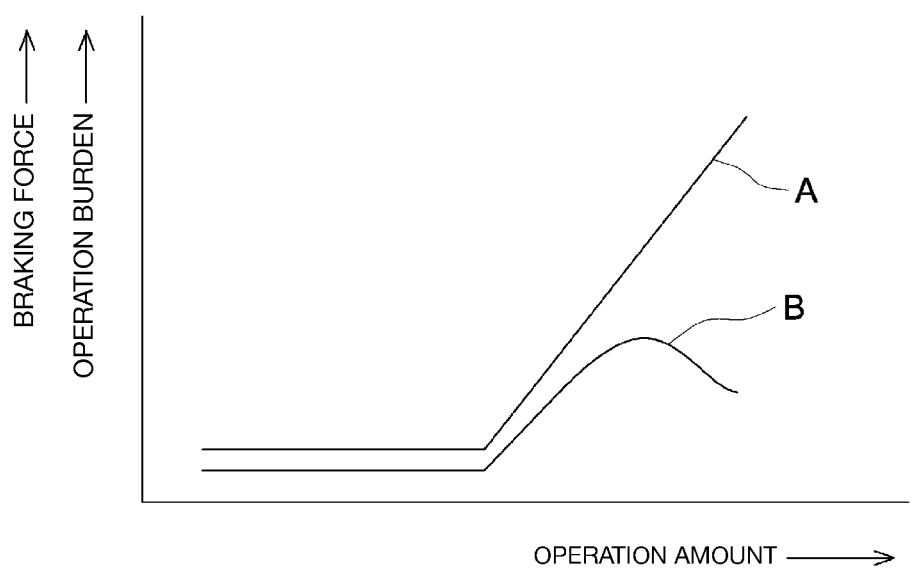
FIG. 14 is a graph illustrating the relationship between the operation amount, braking force, and operation burden in accordance with activation of the electric brake operating device exemplified in the first embodiment.

With the above-described configuration, in a case where the second brake operating device 100 activates the left and right brakes 42, forward rotational power is firstly transmitted from the electric motor 102 to the output gear 110 so that the output gear 110 rotates in the braking direction, and, accordingly, the linkage pin 112 moves from the non-operating position toward the maximum operating position on an arc trajectory. Here, as illustrated in FIG. 14, the braking force A of the left and right brakes 42 increases according to the amount of movement of the linkage pin 112 after passing through the play area, which includes the non-operating position, until reaching the maximum operating position. On the other hand, regarding the operation burden B imposed on the electric motor 102 in the first movement range, which is after the linkage pin 112 passes through the play area and until the linkage pin 112 crosses the virtual straight line L1, since the reaction force internally generated by the left and right brakes 42, which is from each component such as each friction plate, becomes greater with an increase of the braking force A of the left and right brakes 42 and the left and right brake pedals 40 are urged by the tensional force of the left and right tension springs 46 so as to return to the stepping release position, the operation burden B imposed on the electric motor 102 becomes heavier as the linkage pin 112 gets closer to the virtual straight line L1. However, as the linkage pin 112 gets closer to the virtual straight line L1, the angle θ between the connection line L2, which is connecting the linkage pin 112 and the rotation center of the output gear 110, and the operation-receiving body 101 becomes narrower, and, accordingly, the reaction force from the left and right brakes 42 and the tensional force of the left and right tension springs 46 applied to the left and right brake pedals 40 become less effective as force that returns the linkage pin 112 to the non-operating position, so that the increase amount of the operation burden B imposed on the electric motor 102 decreases. Thereafter, when the linkage pin 112 crosses the virtual straight line L1, the reaction force from the left and right brakes 42 and the tensional force of the left and right tension springs 46 are switched to a state of assisting the electric motor 102 with the braking operation on the left and right brakes 42. Therefore, in the second movement range, which is after the linkage pin 112 crosses the virtual straight line L1 and until the linkage pin 112 reaches the maximum operating position, the operation burden B imposed on the electric motor 102 becomes lighter as the linkage pin 112 gets farther from the virtual straight line L1 and closer to the maximum operating position. Further, in a state where the linkage pin 112 has reached the maximum operating position, the linkage pin 112 is urged by the reaction force from the left and right brakes 42 and the tensional force of the left and right tension springs 46 to move in the braking direction in a state where the movement in the braking direction is restricted by the second receiving part 120B. Accordingly, for example, in a case where the worm reducer 102A of the electric motor 102 is broken or the output gear 110 is damaged in a state where the linkage pin 112 has crossed the virtual straight line L1 and reached the second movement range, the linkage pin 112 is moved to the maximum operating position and held in the maximum operating position by the reaction force from the left and right brakes 42 and the tensional force of the left and right tension springs 46, so that it is possible to maintain the left and right brakes 42 in the braking state so as to maintain the tractor 1 in the braking-and-stopped state.

As a result, it is possible to decrease the operation burden imposed on the electric motor 102 in the braking operation performed by the second brake operating device 100 on the left and right brakes 42, and, in the meantime, in a case where the tractor 1 is braking and stopping because of activation of the second brake operating device 100, it is possible to maintain the tractor 1 in the braking-and-stopped state regardless of whether the worm reducer 102A of the electric motor 102 is broken or the output gear 110 is damaged.

Figure 8:
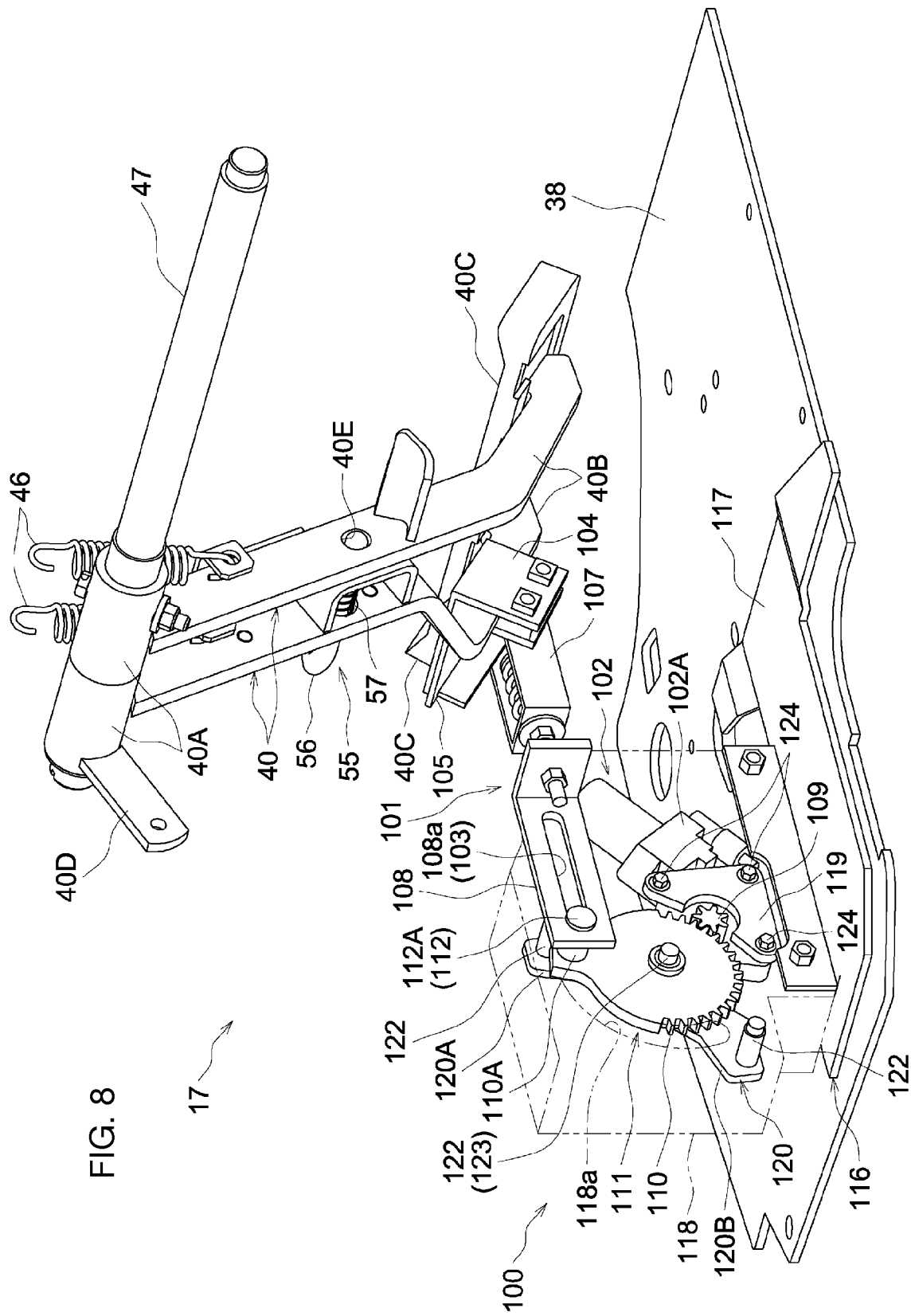
FIG. 8 is a perspective view of a main part illustrating a configuration of the electric brake operating device exemplified in the first embodiment as viewed from the upper right front.
Figure 9:
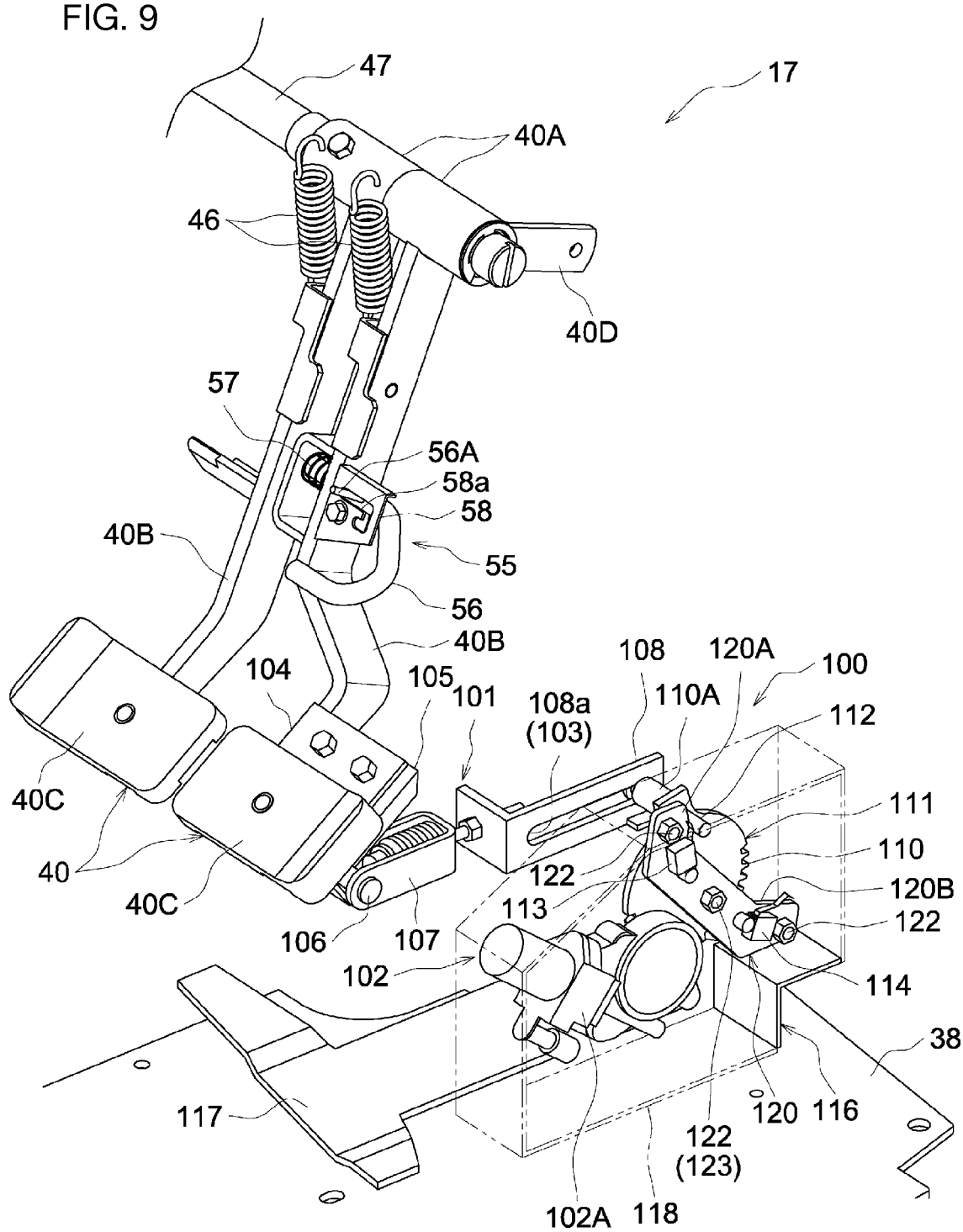
FIG. 9 is a perspective view of a main part illustrating a configuration of the electric brake operating device exemplified in the first embodiment as viewed from the upper right rear.

As illustrated in FIG. 8 to FIG. 10, the first member 104 and the second member 105 are connected via bolts so that the pedal arm part 40B of the brake pedal 40 on the right side is sandwiched therebetween, and, thereby, the operation-receiving body 101 is connected to the brake pedal 40 on the right side. Accordingly, it is possible to connect the operation-receiving body 101 to the brake pedal 40 on the right side without any processing for enabling the brake pedal 40 on the right side to be connected by the operation-receiving body 101.

Figure 15:
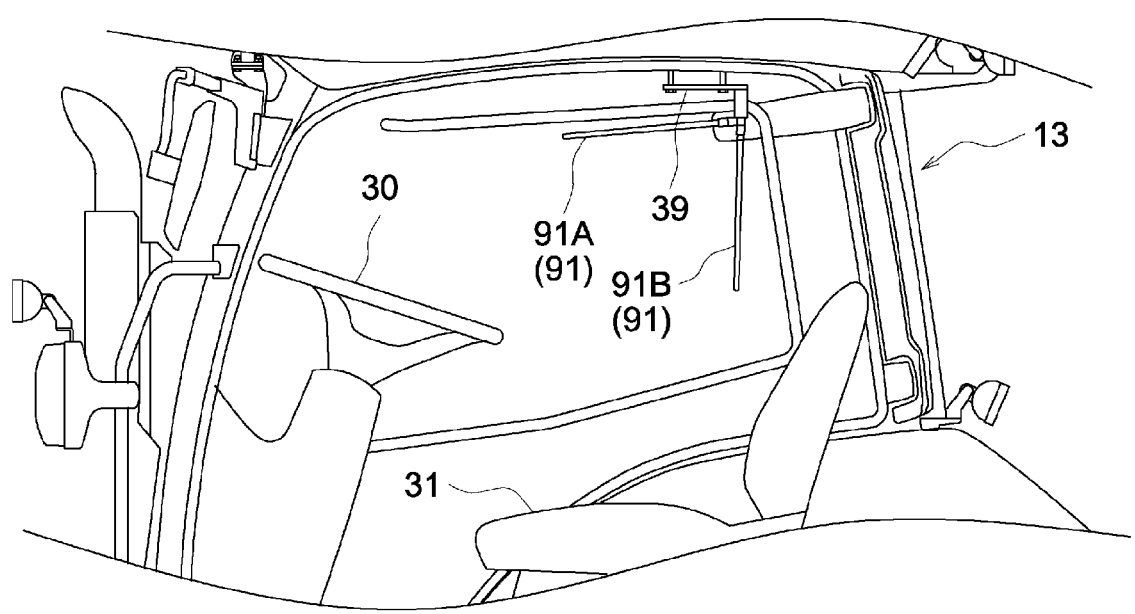
FIG. 15 is a vertical sectional left side view of a main part illustrating the arrangement of a communication antenna for an emergency stop that receives an emergency stop command from an emergency stop remote controller, etc.

As illustrated in FIG. 2 and FIG. 15, in this tractor 1, the communication antenna 91 for an emergency stop which receives an emergency stop command that is sent from the emergency stop remote controller 90 is installed inside the cabin 13. Accordingly, it is possible to shorten an antenna lead extending from the communication antenna 91 to the liquid crystal monitor. The cabin 13 includes an antenna support member 39, which is on the upper part of the right side inside the cabin 13. As the communication antenna 91 for an emergency stop, a first communication antenna 91A extending forward from the support member 39 and a second communication antenna 91B extending downward from the support member 39 are attached to the support member 39. In this way, by mounting two communication antennas 91A and 91B in different directions as the communication antenna 91 for an emergency stop, it is possible to enhance the reception sensitivity of the communication antenna 91 although the communication antenna 91 for an emergency stop is installed inside the cabin 13. Note that it is also possible that only either one of the above-described first communication antenna 91A and second communication antenna 91B is included as the communication antenna 91 for an emergency stop. In addition, it is also possible that communication antenna 91 for an emergency stop is mounted outside the cabin 13 in order to enhance the reception sensitivity thereof.

Second Embodiment

Hereinafter, based on the drawings, the second embodiment whose configuration of the brake system for work vehicles according to the present invention is different from that of the first embodiment is explained as an example of a mode for carrying out the present invention. Note that, as for this brake system exemplified in the second embodiment, since only the configuration of the second brake operating device is different from that of the above-described brake system exemplified in the first embodiment, an explanation is given of the configuration of the second brake operating device only.

Figure 16:
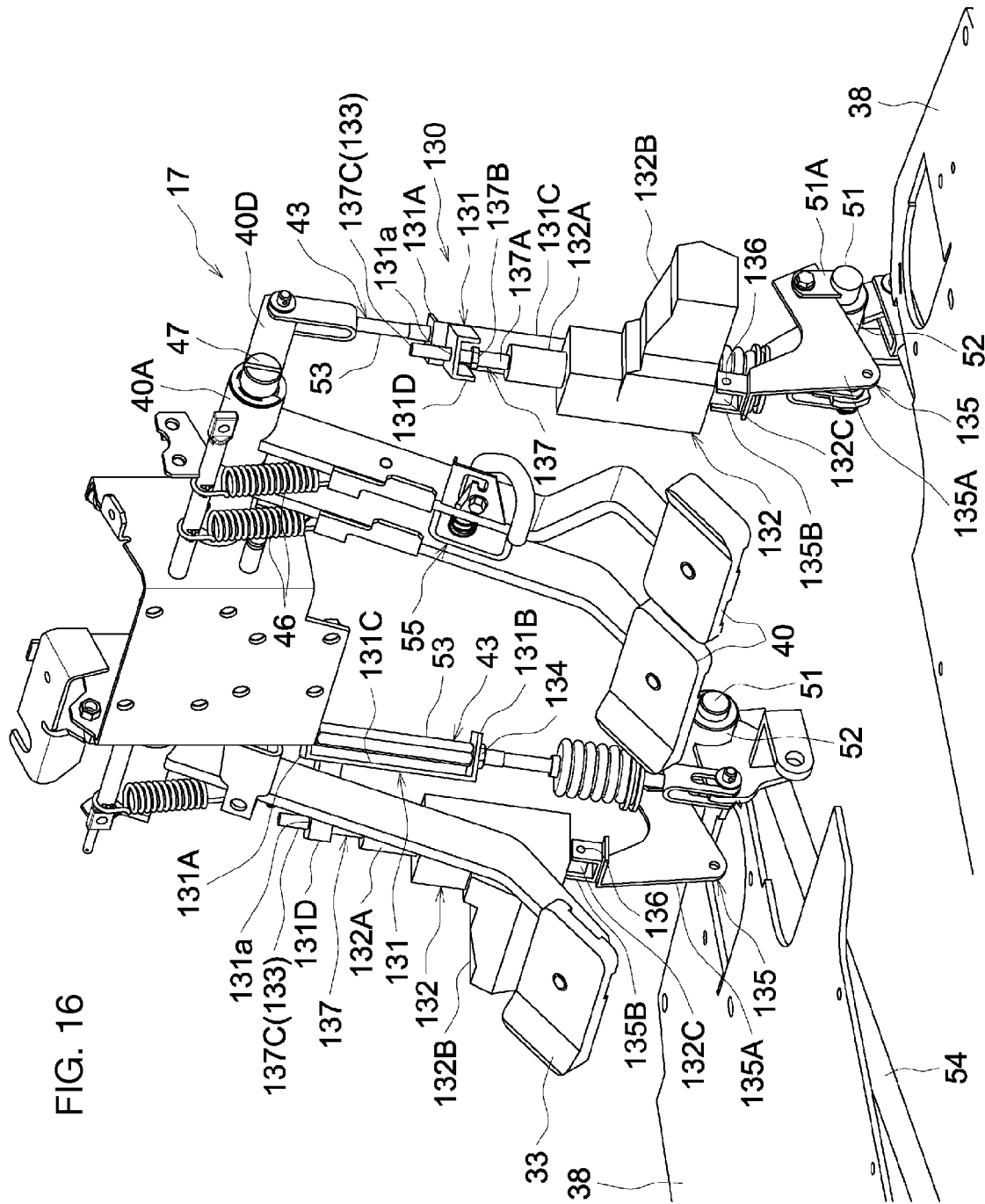
FIG. 16 is a perspective view of a main part illustrating a configuration of an electric brake operating device exemplified in the second embodiment as viewed from the upper right rear.
Figure 17:
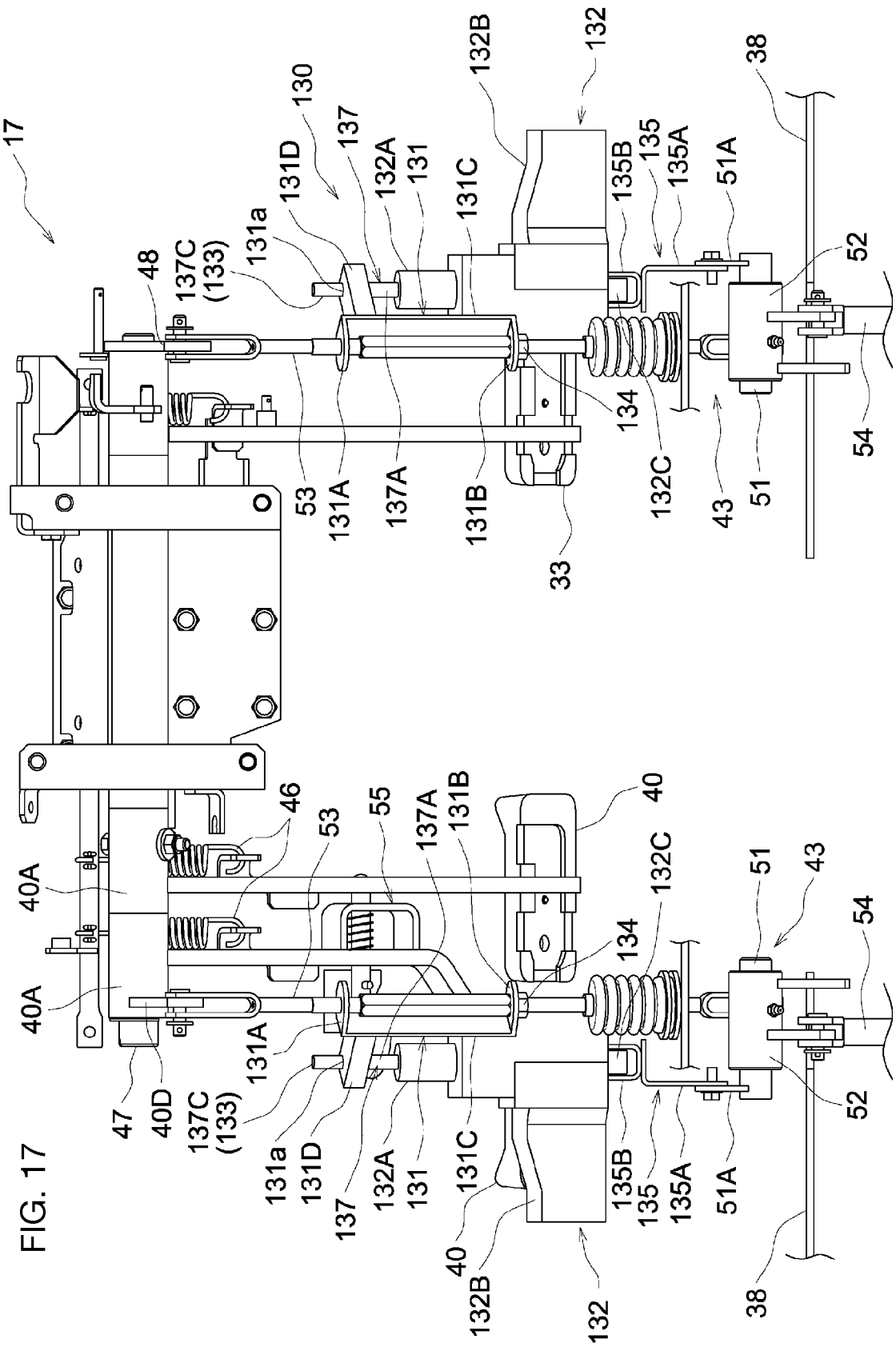
FIG. 17 is a front view of a main part illustrating a configuration of the electric brake operating device exemplified in the second embodiment.

As illustrated in FIG. 16 to FIG. 17, the second brake operating device 130 exemplified in this second embodiment includes left and right operation-receiving bodies 131 that are connected to the first linkage rods 53 of the left and right first linkage mechanisms 43, left and right electric actuators 132 that operate the left and right operation-receiving bodies 131 in the up-down direction, flexibility-provided sections 133 that are formed between the left and right first linkage mechanisms 43 and the left and right electric actuators 132 so as to allow the left and right first linkage mechanisms 43, etc., to change positions thereof relative to the left and right electric actuators 132 according a stepping operation of the left and right brake pedals 40, etc.

Each of the left and right operation-receiving bodies 131 includes an upper end part 131A and a lower end part 131B that are formed with a through hole to which the first linkage rod 53 is inserted, a middle part 131C extending between the upper and lower end parts 131A and 131B, and an arm part 131D extending in a lateral direction from the middle part 131C. In each of the left and right operation-receiving bodies 131, the upper end part 131A is supported by the first linkage rod 53. In addition, the lower end part 131B is fixed to the first linkage rod 53 by use of a nut 134. The arm part 131D moves between the lower limit position, which corresponds to the stepping release position of the brake pedal 40, and the upper limit position, which corresponds to the maximum stepping position of the brake pedal 40, in conjunction with a stepping operation of the corresponding brake pedal 40. The arm part 131D is formed with a through hole 131a for linking the arm part 131D with the electric actuator 132.

For the left and right electric actuators 132, electric cylinders including cylinder parts 132A, which are disposed in parallel adjacent to the corresponding first linkage rods 53, and motor parts 132B for expanding and contracting the cylinder parts 132A are adopted. According to control operation of the steering control unit 22C, the left and right electric cylinders 132 are switched to a first operation state in which the motor parts 132B output forward rotational power so as to expand the cylinder parts 132A, a second operation state in which the motor parts 132B output reverse rotational power so as to contract the cylinder parts 132A, or an operation stopped state in which the motor parts 132B stop outputting rotational power so as to stop expansion or contraction of the cylinder parts 132A.

The left and right electric cylinders 132 include connection parts 132C formed at the lower end parts thereof. Further, those connection parts 132C are supported by the left and right fixed shafts 51, which support the boss members 52 of the left and right first linkage mechanisms 43, via the left and right support brackets 135. Each of the left and right support brackets 135 includes a lower bracket part 135A in an L-shape, which is connected to the arm part 51A of the fixed shaft 51 in a state of being received by the fixed shaft 51, and an upper bracket part 135B in a U-shape, which is connected to the upper end of the lower bracket part 135A. Further, the connection part 132C of the electric cylinder 132 is connected to the upper bracket part 135B via a connection pin 136 that is extending in the left-right direction.

In each of the left and right electric cylinders 132, the cylinder part 132A includes a linkage rod 137 extending upward from the upper part thereof so as to link the cylinder part 132A with the arm part 131D of the operation-receiving body 131. The linkage rod 137 includes a male screw part 137A that is detachably screwed and connected to the cylinder part 132A, a contact part 137B in a large diameter that makes contact from below with the arm part 131D of the operation-receiving body 131, and a linkage part 137C that is inserted to the through hole 131a of the arm part 131D so as to be linked with the operation-receiving body 131. The contact part 137B moves between a non-operating position, which is set below the arm part 131D being in the lower limit position, and a maximum operating position for pushing the arm part 131D up to the upper limit position according to the cylinder part 132A expanding and contracting by rotational power from the motor part 132B. The linkage part 137C has an enough length in the up-down direction to allow the arm part 131D to move from the lower limit position to the upper limit position in conjunction with a stepping operation of the brake pedal 40, so as to function as the above-described flexibility-provided section 133. Accordingly, when stepping operations are performed on the left and right brake pedals 40, the upward movement of the operation-receiving bodies 131 relative to the linkage parts 137C according to those operations are allowed because of the flexibility provided by the length of the linkage parts 137C in the up-down direction. The left and right electric cylinders 132 include internal sensors that detect the contact parts 137B reaching the non-operating positions and the maximum operating positions, based on the operation amounts of expanding or contracting the cylinder parts 132A according to rotational power from the motor parts 132B.

The contact parts 137B move between the non-operating position and the maximum operating position by activation of the left and right electric cylinders 132, so that the state of the second brake operating device 130 transitions between the non-activation state in which the left and right brakes 42 are not operated and the maximum activation state in which the operation amount of the left and right brakes 42 is maximized. Further, this transition can be detected by the above-described internal sensors. That is, the internal sensor of each electric cylinder 132 functions as a state detection sensor that detects the second brake operating device 130 being in the non-activation state and in the maximum activation state.

With the above-described configuration, in a case where the tractor 1 including this second brake operating device 130 is autonomously traveling in an unmanned state, when any of the conditions for an emergency stop is satisfied so that an emergency stop command is sent from the autonomous travel control unit 22E, the steering control unit 22C performs the forward rotational power output process in response to the emergency stop command. As a result, in the left and right electric cylinders 132, the motor parts 132B output forward rotational power, and the cylinder parts 132A expand because of this forward rotational power, so that the contact parts 137B of the linkage rods 137 move from the non-operating position to the maximum operating position. Accordingly, the arm parts 131D of the left and right operation-receiving bodies 131 are pushed up from the lower limit position to the upper limit position, and the left and right first linkage rods 53 move upward as well. Further, because of this movement, even though the left and right brake pedals 40 are not connected by the connection mechanism 55, an operation of pulling the left and right brake pedals 40 from the stepping release position to the maximum stepping position against the tensional force of the left and right tension springs 46, and the left and right brakes 42 are switched from the released state to the braking state against the action of the internal urging members as well. As a result, it is possible to quickly brake and stop the tractor 1 that is autonomously traveling in an unmanned state.

Further, when the contact parts 137B reach the maximum operating positions, the steering control unit 22C performs the rotational power output stop process, based on detection by the internal sensors. As a result, in the left and right electric cylinders 132, the motor parts 132B stop outputting rotational power, and the cylinder parts 132A stop expanding or contracting along with this output stop, so the contact parts 137B of the linkage rods 137 are maintained in the maximum operating positions. As a result, the arm parts 131D of the left and right operation-receiving bodies 131 are maintained in the upper limit positions, and the left and right first linkage rods 53 are prevented from moving downward. Further, because of this prevention of movement, the left and right brake pedals 40 are maintained in the maximum stepping positions, and the left and right brakes 42 are maintained in the braking state. As a result, the tractor 1 can be maintained in the braking-and-stopped state.

In addition, when a stepping operation is performed on either one or both of the left and right brake pedals 40 during manual driving of the tractor 1 by the passenger, the braking operation on either one or both of the left and right brakes 42 in conjunction with the stepping operation can be performed smoothly without interference from the left and right electric cylinders 132 because of the action of the flexibility-provided sections 133.

That is, it is possible for the brake system 17 to include a brake operation system for an emergency stop, which is for enabling the tractor 1 to quickly brake and stop in a case where an abnormality occurs in the tractor 1 while autonomously traveling in an unmanned state and for maintaining the tractor 1 in the braking-and-stopped state even in an engine stopped state, without causing any problem for a passenger manually driving the tractor 1.

Moreover, since this second brake operating device 130 operates the left and right first linkage rods 53 individually by use of the left and right electric cylinders 132, the second brake operating device 130 can also be used as the first brake operating device 45 for braking turns. Thereby, it is possible to simplify the configuration by using the second brake operating device 130 also as the first brake operating device 45.

On the other hand, in a state where this second brake operating device 130 is operated to activate the left and right brakes 42 so that the tractor 1 is braking and stopped, it is possible to detach the left and right electric cylinders 132 from between the left and right operation-receiving bodies 131 and the left and right support brackets 135 by pulling off the left and right connection pins 136 that connect the connection parts 132C of the left and right electric cylinder 132 to the upper bracket parts 135B of the left and right support brackets 135. Accordingly, the left and right brake pedals 40 return from the maximum stepping position to the stepping release position by the actions of the left and right tension springs 46. In addition, the left and right brakes 42 return from the braking state to the released state by the actions of the internal urging members.

That is, in a state where the tractor 1 has been emergently stopped because of the above-described control operation for an emergency stop, the left and right electric cylinders 132 can be detached from between the left and right operation-receiving bodies 131 and the left and right support brackets 135 by pulling off the left and right connection pins 136 after operating the key switch so as to turn off the power source. Then, after pulling off the left and right connection pins 136, by operating the key switch so as to turn on the power source again, it is possible to enable manual driving of the tractor 1 by the passenger. As a result, the passenger can manually drive the tractor 1 to move to a safe place, a repair factory, or the like.

Third Embodiment

Hereinafter, based on the drawings, the third embodiment whose configuration of the brake system for work vehicles according to the present invention is different from that of the first embodiment and the second embodiment is explained as an example of a mode for carrying out the present invention. Note that, as for this brake system exemplified in the third embodiment, since only the configuration of the second brake operating device is different from that of the above-described brake systems exemplified in the first embodiment and the second embodiment, an explanation is given of the configuration of the second brake operating device only.

Figure 18:
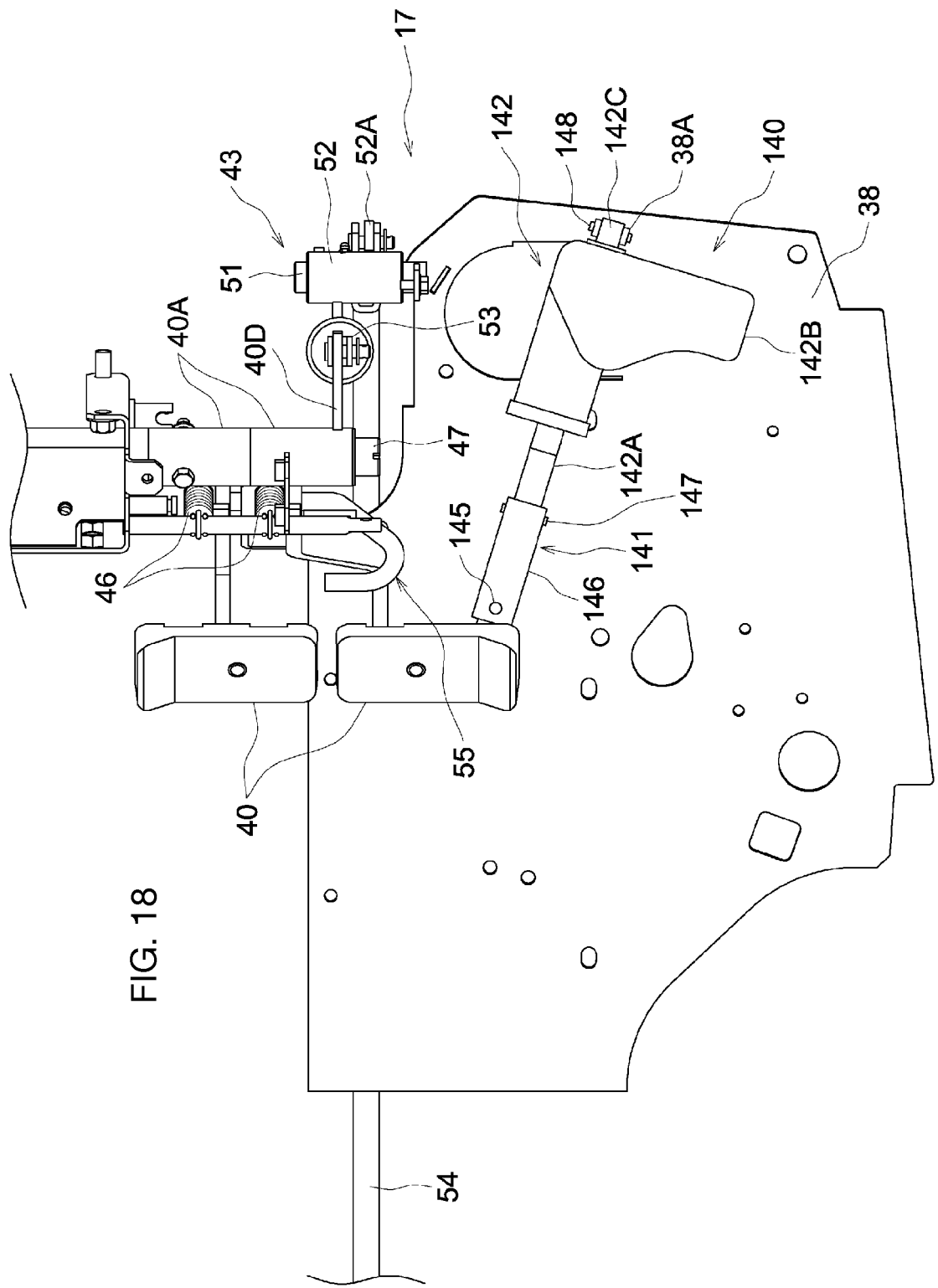
FIG. 18 is a plan view of a main part illustrating a configuration of an electric brake operating device exemplified in the third embodiment.
Figure 19:
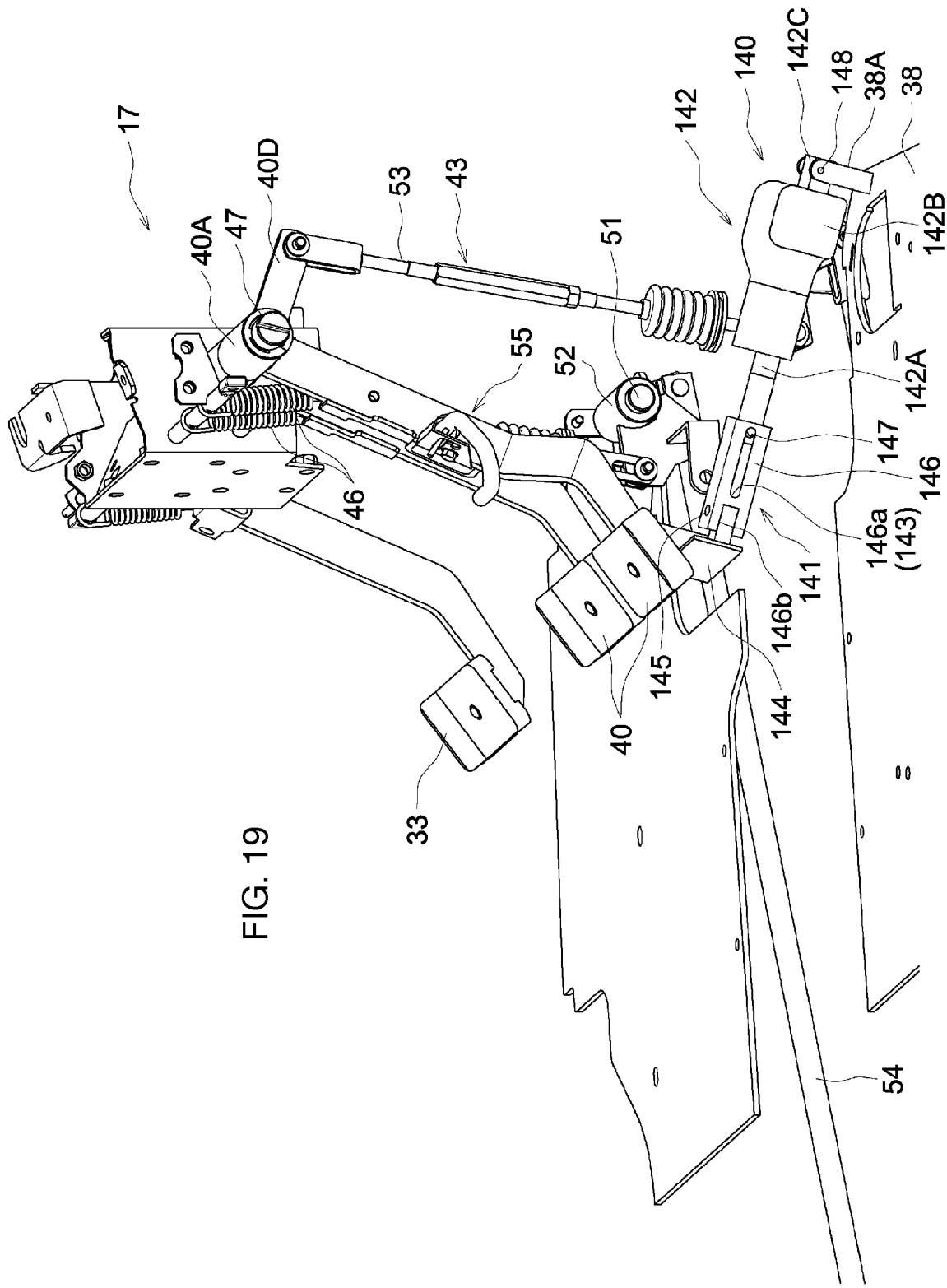
FIG. 19 is a perspective view of a main part illustrating a configuration of the electric brake operating device exemplified in the third embodiment as viewed from the upper right rear.

As illustrated in FIG. 18 to FIG. 19, the brake system 17 includes an electric second brake operating device 140 that activates the left and right brakes 42 in the emergency traveling stop control of the steering control unit 22C in response to an emergency stop command from the autonomous travel control unit 22E. The second brake operating device 140 is disposed to the right of the brake pedal 40 on the right side in the driving section 12. The second brake operating device 140 includes an operation-receiving body 141 that is connected to the brake pedal 40 on the right side, an electric actuator 142 that operates the operation-receiving body 141 in the front-back direction, a flexibility-provided section 143 that is disposed between the brake pedal 40 on the right side and the electric actuator 142 for allowing the brake pedal 40 on the right side, etc., to change positions thereof relative to the electric actuator 142 in accordance with a stepping operation on the brake pedal 40.

In the second brake operating device 140, the operation-receiving body 141 includes a first member 144, which is connected to the pedal arm part 40B of the brake pedal 40 on the right side, and a second member 146 in a shape of a polygonal pipe that is connected to the first member 144 so as to be swingable in the left-right direction via a first connection pin 145 extending in the up-down direction. Further, the second member 146 is formed with left and right elongated holes 146a, which are long in the front-back direction so as to function as the flexibility-provided section 143, and left and right concave sections 146b, which allow the second member 146 to swing in the left-right direction relative to the first member 144.

For the electric actuator 142, an electric cylinder including a cylinder part 142A, which is linked with the second member 146 so as to be swingable in the up-down direction via a linkage pin 147 extending in the left-right direction, and a motor part 142B that expands and contracts the cylinder part 142A is adopted. The electric cylinder 142 includes a connection part 142C formed on an end part (front end part) of the motor part side. Further, the connection part 142C is linked with a support part 38A of the floor plate 38 so as to be swingable in the up-down direction via a second connection pin 148 extending in the left-right direction. According to the control operation of the steering control unit 22C, the electric cylinder 142 is switched to a first operation state in which the motor part 142B outputs forward rotational power so as to contract the cylinder part 142A, a second operation state in which the motor part 142B outputs reverse rotational power so as to expand the cylinder part 142A, or an operation stopped state in which the motor part 142B stops outputting rotational power so as to stop expansion and contraction of the cylinder part 142A.

The linkage pin 147 links the second member 146 of the operation-receiving body 141 and the cylinder part 142A of the electric cylinder 142 via the flexibility-provided section 143. The linkage pin 147 moves from the non-operating position, in which the brake pedal 40 on the right side (the brake 42 on the right side) is not operated, to the maximum operating position, in which the operation amount of the brake pedal 40 on the right side (the brake 42 on the right side) is maximized, due to the cylinder part 142A contracting because of the forward rotational power from the motor part 142B, and the linkage pin 147 moves from the maximum operating position to the non-operating position due to the cylinder part 142A expanding because of the reverse rotational power from the motor part 142B. The non-operating position of the linkage pin 147 is set so that the linkage pin 147 is located at the front end part of the left and right elongated holes 146a when the brake pedal 40 on the right side is located at the stepping release position. Accordingly, when a stepping operation is performed on the brake pedal 40 on the right side, the forward movement of the operation-receiving body 141 relative to the linkage pin 147 according to this operation is allowed because of the flexibility provided by the left and right elongated holes 146a of the second member 146. The electric cylinder 142 includes an internal sensor that detects the linkage pin 147 reaching the non-operating position and the maximum operating position, based on the operation amount of expanding or contracting the cylinder part 142A according to rotational power from the motor part 142B.

The linkage pin 147 moves between the non-operating position and the maximum operating position by activation of the electric cylinder 142, so that the state of the second brake operating device 140 transitions between the non-activation state in which the left and right brakes 42 are not operated and the maximum activation state in which the operation amount of the left and right brakes 42 is maximized. Further, this transition can be detected by the above-described internal sensor. That is, the internal sensor of the electric cylinder 142 functions as a state detection sensor that detects the second brake operating device 140 being in the non-activation state and in the maximum activation state.

With the above-described configuration, in a case where the tractor 1 including this second brake operating device 140 is autonomously traveling in an unmanned state, when any of the conditions for an emergency stop is satisfied so that an emergency stop command is sent from the autonomous travel control unit 22E, the steering control unit 22C performs the forward rotational power output process in response to the emergency stop command. As a result, in the electric cylinder 142, the motor part 142B outputs forward rotational power, and the cylinder part 142A contracts because of this forward rotational power, so that the linkage pin 147 moves from the non-operating position to the maximum operating position. Here, in a case where the left and right brake pedals 40 are connected by the connection mechanism 55, an operation of pulling the left and right brake pedals 40 from the stepping release position to the maximum stepping position is performed against the tensional force of the left and right tension springs 46 in conjunction with the movement of the linkage pin 147. Accordingly, the operational force from the electric cylinder 142 is transmitted to the operation arms 50 of the left and right brakes 42 via the left and right brake pedals 40 and the left and right first linkage mechanisms 43, so that the left and right brakes 42 are switched from the released state to the braking state against the actions of the internal urging members. As a result, it is possible to quickly brake and stop the tractor 1 that is autonomously traveling in an unmanned state.

Further, when the linkage pin 147 reaches the maximum operating position, the steering control unit 22C performs the rotational power output stop process, based on detection by the internal sensor. As a result, in the electric cylinder 142, the motor part 142B stops outputting rotational power, and the cylinder part 142A stops expanding or contracting along with this output stop, so the linkage pin 147 is maintained in the maximum operating position. Accordingly, the left and right brake pedals 40 are maintained in the maximum stepping positions, and the left and right brakes 42 are maintained in the braking states. As a result, the tractor 1 can be maintained in the braking-and-stopped state.

In addition, when a stepping operation is performed on the brake pedal 40 on the right side or on the left and right brake pedals 40 during manual driving of the tractor 1 by the passenger, the braking operation of the brake 42 on the right side or the left and right brakes 42 in conjunction with the stepping operation can be performed smoothly without interference from the left and right electric cylinders 142 because of the action of the flexibility-provided section 143.

Moreover, since the second brake operating device 140 is disposed in the right-side area of the driving section 12, which is not frequently used for getting on and off the driving section 12 because of many operation tools such as the left and right brake pedals 40 and an accelerator pedal disposed therein, it is possible to avoid deterioration of the convenience for getting on and off the driving section 12 from the left side, which is frequently used for getting on and off the driving section 12.

That is, it is possible for the brake system 17 to include a brake operation system for an emergency stop, which is for enabling the tractor 1 to quickly brake and stop in a case where an abnormality occurs in the tractor 1 while autonomously traveling in an unmanned state and for maintaining the tractor 1 in the braking-and-stopped state even in an engine stopped state, without causing any problem for a passenger manually driving the tractor 1 or a passenger getting on and off the driving section 12 from the left side.

On the other hand, in the state where the tractor 1 is braked and stopped due to activation of the left and right brakes 42 caused by an operation of this second brake operating device 140, it is possible to release the linkage of the second member 146 of the operation-receiving body 141 and the cylinder part 142A of the electric cylinder 142 by releasing the retention of the linkage pin 147 with a beta pin or the like and pulling off the linkage pin 147 from the cylinder part 142A of the electric cylinder 142, etc. Accordingly, the left and right brake pedals 40 return from the maximum stepping position to the stepping release position by the actions of the left and right tension springs 46. In addition, the left and right brakes 42 return from the braking state to the released state by the actions of the internal urging members.

That is, in the state where the tractor 1 has been urgently stopped because of the above-described control operation for an emergency stop, the power source is turned off by operating the key switch, and then the linkage pin 147 is pulled off in order to release the linkage of the operation-receiving body 141 and the electric cylinder 142. Then, after the release, by operating the key switch to turn on the power source again, it is possible to enable manual driving of the tractor 1 by the passenger. As a result, the passenger can manually drive the tractor 1 to move to a safe place, a repair factory, or the like.

Other Embodiments

Explanations are given of other embodiments of the present invention. Note that the configuration of each embodiment explained below can be applied not only independently but also in combination with the configuration of another embodiment.

(1) Another typical embodiment regarding the configuration of the work vehicle is as follows. For example, it is also possible that the work vehicle is configured as a semi-crawler model including left and right front wheels 10 and left and right crawlers, instead of the left and right rear wheels 11, as traveling devices. For example, it is also possible that the work vehicle is configured as a full-crawler model including left and right crawlers, instead of the left and right front wheels 10 and the left and right rear wheels 11, as traveling devices. For example, it is also possible that the work vehicle has a configuration including a protective frame extending upward from the tractor 1, instead of the cabin 13.

(2) It is also possible that the brake system 17 has a configuration including a single brake 42, which brakes left and right traveling devices 11, and a single brake pedal 40, which is linked with this brake 42 in such a manner as to allow the single brake 42 and the single brake pedal 40 to operate in configuration with each other via the linkage mechanism 43.

Figure 20:
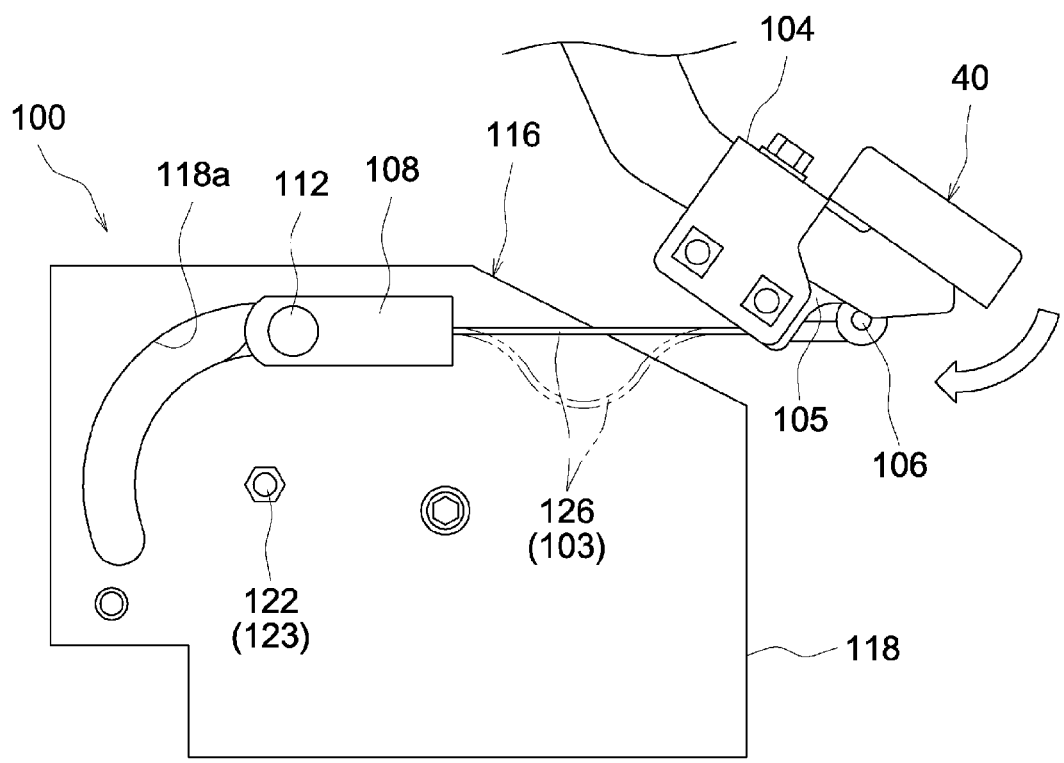
FIG. 20 is a left side view of a main part illustrating another embodiment in which the flexibility-provided section in the electric brake operating device exemplified in the first embodiment is configured with a wire.

(3) As illustrated in FIG. 20, it is also possible that the electric brake operating device 100 exemplified in the first embodiment has a configuration including a wire 126 extending from the connection pin 106 to the link plate 108, instead of the damper 107 of the operation-receiving body 101. In this configuration, when a stepping operation is performed on the brake pedal 40 on the right side or on the left and right brake pedals 40 during manual driving of the tractor 1 by the passenger, the wire 126 is loosened so as to function as the flexibility-provided section 103 that allows the braking operation to be performed on the brake 42 on the right side or the left and right brakes 42 in configuration with the stepping operation. Accordingly, the braking operation on the brake 42 on the right side or the left and right brakes 42 in conjunction with the stepping operation on the brake pedal 40 on the right side or the left and right brake pedals 40 can be performed smoothly without interference from the left and right electric motors 102. Further, since the wire 126 functions as the flexibility-provided section 103 as described above, it is possible to omit the process of forming the elongated hole 108a, which is necessary in the brake operating device 100 illustrated in FIG. 8 to FIG. 12, on the link plate 108. In addition, in a case where a stepping operation is performed on the brake pedal 40 on the right side or the left and right brake pedals 40, since the link plate 108 is prevented from moving farther toward the front side of the vehicle body relative to the linkage pin 112 in conjunction with this stepping operation, it is possible to avoid the possibility that the link plate 108 makes contact with other objects on the farther front side of the vehicle body relative to the linkage pin 112.

Figure 21:
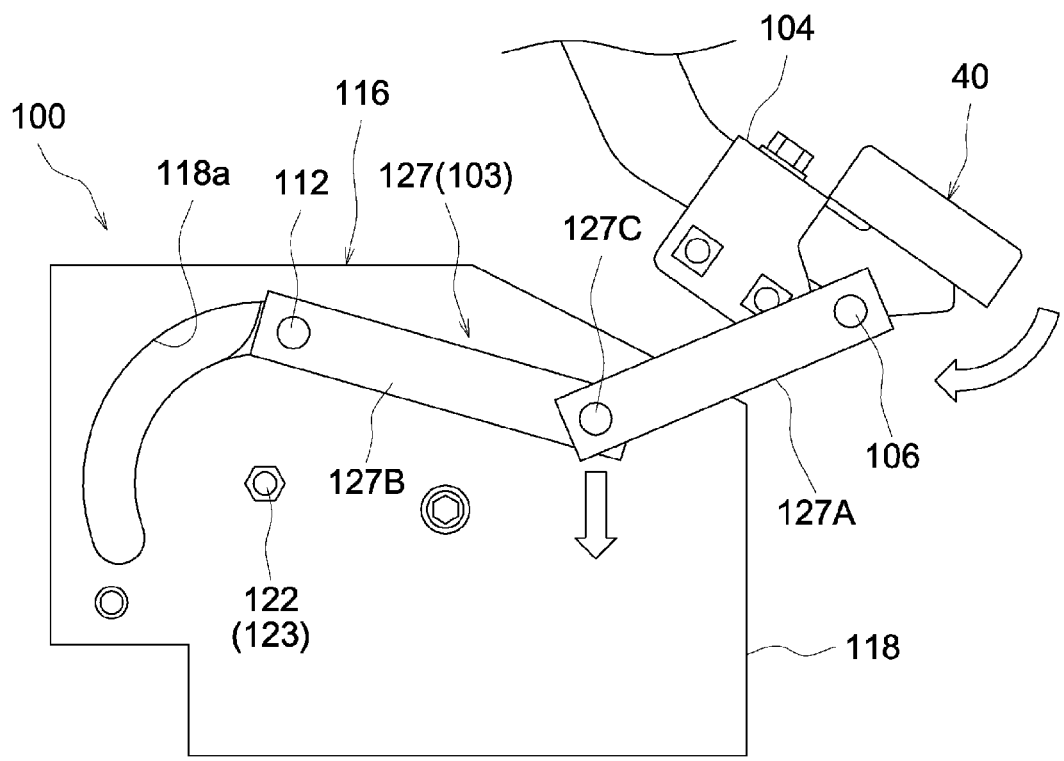
FIG. 21 is a left side view of a main part illustrating another embodiment in which the flexibility-provided section in the electric brake operating device exemplified in the first embodiment is configured with a link mechanism.

(4) As illustrated in FIG. 21, it is also possible that the electric brake operating device 100 exemplified in the first embodiment has a configuration including a link mechanism 127 that can be bent in the up-down direction, instead of the damper 107 and the link plate 108 of the operation-receiving body 101. In this configuration, the link mechanism 127 includes a first link plate 127A that is supported by the connection pin 106 so as to be swingable in the up-down direction, a second link plate 127B that is supported by the linkage pin 112 so as to be swingable in the up-down direction, and a connection pin 127C that is long in the left-right direction to connect the front end part of the first link plate 127A to the rear end part of the second link plate 127B. Further, in this configuration, when a stepping operation is performed on the brake pedal 40 on the right side or on the left and right brake pedals 40 during manual driving of the tractor 1 by the passenger, the link mechanism 127 is bent downward so as to function as the flexibility-provided section 103 that allows the braking operation to be performed on the brake 42 on the right side or the left and right brakes 42 in configuration with the stepping operation. Accordingly, the braking operation on the brake 42 on the right side or the left and right brakes 42 in conjunction with the stepping operation on the brake pedal 40 on the right side or the left and right brake pedals 40 can be performed smoothly without interference from the left and right electric motors 102. Further, since the link mechanism 127 functions as the flexibility-provided section 103 as described above, it is possible to omit the process of forming the elongated hole 108a, which is necessary in the brake operating device 100 illustrated in FIG. 8 to FIG. 12, on the second link plate 127B or the like. In addition, in a case where a stepping operation is performed on the brake pedal 40 on the right side or the left and right brake pedals 40, since the link mechanism 127 is prevented from moving farther toward the front side of the vehicle body relative to the linkage pin 112 in conjunction with this stepping operation, it is possible to avoid the possibility that the link mechanism 127 makes contact with other objects on the farther front side of the vehicle body relative to the linkage pin 112.

(5) As illustrated in FIG. 22, it is also possible that the electric brake operating device 100 exemplified in the first embodiment has a configuration including the housing case 116, the linkage pin 112, etc., disposed in the front left side portion of the driving section 12 as well as a wire 128 extending from the brake pedal 40 on the right side to the linkage pin 112 and multiple guide pulleys 129 for guiding the wire by pushing and pulling the wire 128, so that the wire 128 is used as the operation-receiving body 101 and the flexibility-provided section 103. In this configuration, since the second brake operating device 100 is disposed on the left side in the driving section 12, not on the right side in the driving section 12 where many operation tools such as the left and right brake pedals 40 and an accelerator pedal are disposed, it is possible to avoid the possibility that the second brake operating device 100 interferes with operations of the left and right brake pedals 40, the accelerator pedal, etc., in a case where the passenger manually drives the tractor 1. In addition, when a stepping operation is performed on the brake pedal 40 on the right side or on the left and right brake pedals 40 during manual driving, the wire 128 is loosened so as to allow a braking operation to be performed on the brake 42 on the right side or the left and right brakes 42 in configuration with the stepping operation. Accordingly, the braking operation on the brake 42 on the right side or the left and right brakes 42 in conjunction with the stepping operation on the brake pedal 40 on the right side or the left and right brake pedals 40 can be performed smoothly without interference from the left and right electric motors 102. Note that it is also possible that the brake operating device 100 exemplified in this other embodiment has a configuration including a control cable extending from the brake pedal 40 on the right side to the linkage pin 112, instead of the wire 128 and the multiple guide pulleys 129.

(6) Regarding the electric brake operating device 100 exemplified in the first embodiment, for example, it is also possible that the linkage pin 112 is connected to the link plate 108 of the operation-receiving body 101 and that an elongated hole in an arc shape that functions as the flexibility-provided section 103 is formed in the output gear 110 of the deceleration gear set 111.

(7) For example, it is also possible that the electric brake operating device 100 exemplified in the first embodiment and the electric brake operating device 140 exemplified in the third embodiment have configurations in which the operation-receiving bodies 101 and 141 are connected to the brake pedal 40 on the left side or the first linkage rod 53 of either one of the left and right linkage mechanisms 43.

(8) For example, it is also possible that the electric brake operating device 130 exemplified in the second embodiment has a configuration in which the left and right operation-receiving bodies 131 are connected to the left and right brake pedals 40.

(9) For example, it is possible that a first proximity switch that detects the linkage pin 112 reaching the non-operating position and a second proximity switch that detects the linkage pin 112 reaching the maximum operating position are adopted for the state detection sensors 113 and 114.

(10) For example, it is also possible that the housing case 116 has a configuration in which the base plate 117 is not included and that the left-side casing 118 that is detachably connected to the fixed section of the vehicle body via bolts, the right-side casing 121 that is connected to the left-side casing 118 via bolts, etc., are included.

(11) For example, it is also possible that the housing case 116 is configured to be attached to a fixed section of the vehicle body other than the floor plate 38, such as the front frame 34 or a cabin frame.

Industrial Applicability

For example, the brake system for work vehicles according to the present invention can be applied to a work vehicle such as a tractor, riding-type mower, a riding-type rice transplanter, a combine, a haulage vehicle, a wheel loader, or a snowplow.

DESCRIPTION OF REFERENCE NUMERALS 11 traveling device (left and right rear wheels)
12 driving section
38 fixed section (floor plate)
40 brake pedal
42 brake
43 linkage mechanism
100 electric brake operating device
101 operation-receiving body
102 electric actuator (electric motor)
103 flexibility-provided section (elongated hole)
110 output gear
111 deceleration gear set
112 linkage pin
113 state detection sensor
114 state detection sensor
116 housing case
120A movement restricting part
120B movement restricting part
130 electric brake operating device
131 operation-receiving body
132 electric actuator (electric cylinder)
133 flexibility-provided section (linkage part)
140 electric brake operating device
141 operation-receiving body
142 electric actuator (electric cylinder)
143 flexibility-provided section (elongated hole)
L1 virtual straight line

The invention claimed is:
1. A brake system for work vehicles comprising:
a brake pedal disposed in a driving section;
a brake configured to brake a traveling device;

a linkage mechanism configured to link the brake pedal and the brake in such a manner as to allow the brake pedal and the brake to operate in conjunction with each other; and an electric brake operating device configured to activate the brake in response to an emergency stop command, wherein the electric brake operating device includes
- an operation-receiving body that is connected to the brake pedal or the linkage mechanism,
- an electric actuator that operates the operation-receiving body, and
- a flexibility-provided section that allows displacement of the brake pedal and the linkage mechanism relative to the electric actuator in accordance with an operation of stepping on the brake pedal, wherein the flexibility-provided section is disposed between the brake pedal or the linkage mechanism and the electric actuator.

2. The brake system for work vehicles according to claim 1,
wherein the brake operating device transitions between a non-activation state in which the brake is not operated and a maximum activation state in which an operation amount of the brake is maximized, by activation of the electric actuator, and
wherein the brake system comprises a state detection sensor configured to detect the non-activation state and the maximum activation state of the brake operating device.

3. The brake system for work vehicles according to claim 1,
wherein the electric actuator is an electric motor that outputs rotational power,
wherein the brake operating device includes a housing case which is attached to a fixed section of a vehicle body, and a deceleration gear set that decelerates the rotational power from the electric motor, and
wherein the electric motor and the deceleration gear set are housed in the housing case.

4. The brake system for work vehicles according to claim 3,
wherein the brake operating device includes a linkage pin that links the operation-receiving body and an outer periphery of an output gear in the deceleration gear set via the flexibility-provided section,
wherein the housing case includes a movement restricting part that restricts a movement range of the linkage pin between a non-operating position in which the brake is not operated and a maximum operating position in which an operation amount of the brake is maximized, and
wherein the movement range of the linkage pin is set as a range in which the linkage pin crosses a virtual straight line, which passes through a connection point of the operation-receiving body connected to the brake pedal or the linkage mechanism and through a rotation center of the output gear, so as to move between the non-operating position and the maximum operating position.

5. The brake system for work vehicles according to claim 1, further comprising:
a hydraulic brake operating device that includes a hydraulic unit, in addition to the electric brake operating device.

* * * * *